US012312164B2

(12) United States Patent
Chen et al.

(10) Patent No.: US 12,312,164 B2
(45) **Date of Patent: *May 27, 2025**

(54) LAWN REFUSE BAG

(71) Applicant: Pratt Corrugated Holdings, Inc., Brookhaven, GA (US)

(72) Inventors: Shifeng Chen, Newport News, VA (US); Greg Sollie, Sharpsburg, GA (US); Jamie Waltermire, Peachtree City, GA (US)

(73) Assignee: Pratt Corrugated Holdings, Inc., Brookhaven, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/109,533

(22) Filed: Feb. 14, 2023

(65) Prior Publication Data

US 2023/0192399 A1 Jun. 22, 2023

Related U.S. Application Data

(63) Continuation of application No. 16/703,272, filed on Dec. 4, 2019.

(Continued)

(51) Int. Cl.
*B65F 1/14* (2006.01)
*B65B 3/04* (2006.01)
(Continued)

(52) U.S. Cl.
CPC .............. *B65F 1/1415* (2013.01); *B65F 1/14* (2013.01); *B65B 3/04* (2013.01); *B65B 51/04* (2013.01);
(Continued)

(58) Field of Classification Search
CPC .......... B65F 1/1415; B65F 1/14; B65F 1/002; B65F 2001/1653; B65F 2220/106;
(Continued)

(56) References Cited

U.S. PATENT DOCUMENTS

| | | | |
|---|---|---|---|
| 398,908 A | 3/1889 | Stevens | |
| 474,382 A | 5/1892 | Haines | |

(Continued)

FOREIGN PATENT DOCUMENTS

| | | | | |
|---|---|---|---|---|
| DE | 202005016813 U1 * | 3/2006 | ............ | B65F 1/1426 |
| DE | 202006003095 U1 * | 8/2006 | ............ | B65F 1/0006 |

(Continued)

OTHER PUBLICATIONS

U.S. Appl. No. 16/703,184, filed Dec. 4, 2019, Chen, et al.

(Continued)

*Primary Examiner* — Jes F Pascua
(74) *Attorney, Agent, or Firm* — Taylor English Duma LLP

(57) ABSTRACT

A lawn refuse bag includes a lawn bag body defining a top end and an interior cavity, the top end defining a top lawn bag opening, the lawn refuse bag configured to receive lawn refuse in the interior cavity through the top lawn bag opening in an open orientation of the lawn refuse bag; a first lawn bag handle assembly coupled to the lawn bag body at the top end; and a second lawn bag handle assembly coupled to the lawn bag body at the top end; wherein the lawn bag body defines a height and a width, and wherein the lawn bag body defines a height-to-width ratio in the open orientation of about 1.6.

26 Claims, 8 Drawing Sheets

Related U.S. Application Data

(60) Provisional application No. 62/896,935, filed on Sep. 6, 2019.

(51) Int. Cl.

| | |
|---|---|
| *B65B 51/04* | (2006.01) |
| *B65D 33/06* | (2006.01) |
| *B65D 33/12* | (2006.01) |
| *B65D 33/16* | (2006.01) |
| *B65F 1/00* | (2006.01) |
| *B65F 1/16* | (2006.01) |

(52) U.S. Cl.
CPC .............. *B65D 33/06* (2013.01); *B65D 33/12* (2013.01); *B65D 33/1608* (2013.01); *B65F 1/002* (2013.01); *B65F 2001/1653* (2013.01); *B65F 2220/106* (2013.01); *B65F 2220/1063* (2013.01); *B65F 2240/138* (2013.01)

(58) Field of Classification Search
CPC ....... B65F 2220/1063; B65F 2240/138; B65D 33/06; B65D 33/12; B65D 33/1608; B65B 3/04; B65B 51/04
USPC ...................... 220/752; 383/6, 120, 125, 126
See application file for complete search history.

(56) References Cited

U.S. PATENT DOCUMENTS

| | | | | |
|---|---|---|---|---|
| 645,544 | A | 3/1900 | Bissell | |
| 672,657 | A | 4/1901 | Vautrot | |
| 1,088,633 | A | 2/1914 | Simmons | |
| 1,234,057 | A | 7/1917 | McIntyre | |
| 1,305,199 | A * | 5/1919 | Deubener | B65D 33/12 383/20 |
| 1,571,608 | A | 2/1926 | Stillman | |
| 1,601,566 | A | 9/1926 | Elliott | |
| 1,846,542 | A | 2/1932 | Budd | |
| 1,858,793 | A | 5/1932 | Archibald | |
| 1,879,410 | A | 9/1932 | Morris et al. | |
| 1,879,950 | A | 9/1932 | Read, Jr. | |
| 1,898,838 | A | 2/1933 | Katz | |
| 1,916,519 | A | 7/1933 | Madsen | |
| 1,986,898 | A | 1/1935 | Smithwick | |
| 2,307,659 | A | 1/1943 | Avery | |
| 2,353,311 | A * | 7/1944 | Karlson | B65D 31/08 383/126 |
| 2,430,155 | A | 11/1947 | Buttery | |
| 2,550,959 | A | 5/1951 | Bowman | |
| 2,580,796 | A | 1/1952 | Kleiss et al. | |
| 2,939,614 | A | 6/1960 | Hill | |
| 2,985,355 | A | 5/1961 | Read | |
| 3,021,767 | A | 2/1962 | Hamilton | |
| 3,023,946 | A * | 3/1962 | Steen | B65D 33/02 383/126 |
| 3,034,699 | A | 5/1962 | Steen | |
| 3,257,068 | A | 6/1966 | Wright | |
| 3,324,906 | A | 6/1967 | Chu | |
| 3,335,769 | A | 8/1967 | Ilg | |
| 3,578,236 | A | 5/1971 | Masayuki | |
| 3,734,340 | A | 5/1973 | Ippolito et al. | |
| 3,746,240 | A | 7/1973 | Flynn | |
| 3,891,136 | A | 6/1975 | Woeste | |
| 3,938,731 | A | 2/1976 | Ross et al. | |
| 3,977,594 | A | 8/1976 | Swan | |
| 3,983,914 | A | 10/1976 | Benson | |
| 3,986,744 | A | 10/1976 | Krogstad et al. | |
| 4,037,778 | A | 7/1977 | Boyle | |
| 4,103,952 | A | 8/1978 | Thompson | |
| 4,115,909 | A | 9/1978 | Corella | |
| 4,139,029 | A | 2/1979 | Geraci | |
| 4,196,928 | A | 4/1980 | Spangler | |
| 4,258,842 | A | 3/1981 | Falkstein | |
| 4,268,081 | A | 5/1981 | Hawkinson | |
| 4,272,116 | A | 6/1981 | Tufte, Jr. | |
| 4,273,167 | A | 6/1981 | Stillwell | |
| 4,338,979 | A | 7/1982 | Dow | |
| 4,361,267 | A | 11/1982 | Wozniacki | |
| 4,366,916 | A | 1/1983 | Guido et al. | |
| 4,386,729 | A | 6/1983 | Schmidt | |
| 4,457,483 | A | 7/1984 | Gagne | |
| 4,530,533 | A | 7/1985 | Dieter | |
| 4,628,007 | A | 12/1986 | Ledsham | |
| 4,643,380 | A | 2/1987 | Copeland | |
| 4,659,045 | A | 4/1987 | Flynn | |
| 4,669,689 | A | 6/1987 | Jones | |
| 4,697,771 | A | 10/1987 | Majors | |
| 4,749,011 | A | 6/1988 | Rylander | |
| 4,760,982 | A | 8/1988 | Cooke | |
| 4,836,970 | A | 6/1989 | Robbins, III | |
| 4,884,603 | A | 12/1989 | Simpson | |
| 4,890,652 | A | 1/1990 | Hoerner | |
| 4,895,456 | A | 1/1990 | Morita | |
| 4,909,553 | A | 3/1990 | Hantover | |
| 4,940,200 | A | 7/1990 | Sawyer | |
| 4,955,496 | A | 9/1990 | Nelson | |
| 4,979,547 | A | 12/1990 | Hoerner | |
| 5,018,637 | A | 5/1991 | Miller | |
| 5,033,780 | A | 7/1991 | Wootten | |
| 5,048,778 | A | 9/1991 | Wright | |
| 5,054,724 | A | 10/1991 | Hutcheson | |
| 5,056,679 | A | 10/1991 | Lonczak | |
| 5,065,965 | A | 11/1991 | Aulabaugh | |
| 5,080,308 | A | 1/1992 | Franks | |
| 5,090,756 | A | 2/1992 | Pfisterer | |
| 5,129,609 | A | 7/1992 | Tobin | |
| 5,186,384 | A | 2/1993 | Nelson | |
| 5,271,589 | A | 12/1993 | Belous | |
| 5,285,988 | A | 2/1994 | Bogren | |
| 5,292,093 | A | 3/1994 | Shumake | |
| 5,316,060 | A | 5/1994 | Hogdon et al. | |
| 5,372,269 | A | 12/1994 | Sutton et al. | |
| 5,400,989 | A | 3/1995 | Gaskill | |
| D361,185 | S | 8/1995 | Seiler et al. | |
| 5,593,117 | A | 1/1997 | Alexander | |
| 5,610,230 | A | 3/1997 | Yoshida et al. | |
| 5,716,033 | A | 2/1998 | Gibson | |
| D391,722 | S | 3/1998 | Sheppard | |
| 5,765,614 | A | 6/1998 | Kardosh | |
| 5,816,431 | A | 10/1998 | Giannopoulos | |
| 5,865,486 | A | 2/1999 | Bussani | |
| 5,868,364 | A | 2/1999 | Macmillan | |
| 5,871,037 | A | 2/1999 | Feldt | |
| 5,897,084 | A | 4/1999 | Judge | |
| 5,915,768 | A | 6/1999 | Young | |
| 5,918,651 | A | 7/1999 | Gazdy et al. | |
| 5,979,842 | A | 11/1999 | Fan | |
| 6,007,030 | A | 12/1999 | Judge | |
| 6,035,908 | A | 3/2000 | Hoffman | |
| 6,045,263 | A | 4/2000 | Keller et al. | |
| 6,073,943 | A | 6/2000 | Serrault | |
| 6,085,647 | A | 7/2000 | Burow | |
| 6,116,548 | A | 9/2000 | Oleson | |
| 6,116,549 | A | 9/2000 | Santa Cruz et al. | |
| 6,131,759 | A | 10/2000 | Young | |
| 6,135,518 | A | 10/2000 | Holthaus | |
| 6,179,306 | B1 | 1/2001 | Maxwell | |
| 6,189,841 | B1 | 2/2001 | LaPoint et al. | |
| 6,202,718 | B1 | 3/2001 | Innocenti | |
| 6,273,156 | B1 | 8/2001 | Carillo | |
| 6,296,212 | B1 | 10/2001 | Monahan | |
| 6,340,037 | B1 | 1/2002 | Stafford | |
| 6,367,747 | B1 | 4/2002 | Mulle | |
| 6,415,713 | B1 | 7/2002 | Abrams | |
| 6,431,435 | B1 | 8/2002 | Jones et al. | |
| 6,450,461 | B1 | 9/2002 | Lohmann | |
| 6,481,617 | B2 | 11/2002 | Yang | |
| 6,536,488 | B1 | 3/2003 | Pochobradsky | |
| 6,554,810 | B1 | 4/2003 | Wilk et al. | |
| 6,659,407 | B2 | 12/2003 | Asaro | |
| D485,166 | S | 1/2004 | Clark | |
| 6,708,742 | B2 | 3/2004 | Weathers et al. | |
| D494,853 | S | 8/2004 | Chan | |

(56) References Cited

U.S. PATENT DOCUMENTS

| | | | |
|---|---|---|---|
| D494,873 | S | 8/2004 | Junod |
| D498,667 | S | 11/2004 | Clark |
| D500,457 | S | 1/2005 | Peeples et al. |
| D502,582 | S | 3/2005 | Boles |
| 6,860,094 | B1 | 3/2005 | Abrams |
| 6,866,070 | B2 | 3/2005 | King |
| 6,896,015 | B2 | 5/2005 | Beveridge |
| D513,352 | S | 12/2005 | Weathers et al. |
| 6,983,965 | B1 | 1/2006 | Bergell |
| 7,066,220 | B1 | 6/2006 | Take et al. |
| 7,066,379 | B2 | 6/2006 | McLeod et al. |
| 7,152,894 | B2 | 12/2006 | Weathers et al. |
| 7,159,761 | B2 | 1/2007 | Abshire et al. |
| 7,246,641 | B2 | 7/2007 | Blessman |
| 7,302,978 | B1 | 12/2007 | Kolarik |
| D567,464 | S | 4/2008 | Dullum |
| 7,367,600 | B1 | 5/2008 | Lew et al. |
| 7,398,913 | B2 | 7/2008 | McClure |
| 7,407,139 | B1 | 8/2008 | Dolan |
| D576,500 | S | 9/2008 | Kim et al. |
| D578,409 | S | 10/2008 | Clark |
| 7,434,721 | B2 | 10/2008 | Feltz |
| 7,494,096 | B2 | 2/2009 | Paloian et al. |
| D593,721 | S | 6/2009 | Koll |
| 7,604,156 | B2 | 10/2009 | Clohessy |
| 7,625,026 | B2 | 12/2009 | Lau |
| 7,651,024 | B2 | 1/2010 | Barner |
| 7,694,838 | B2 | 4/2010 | Yang |
| 7,712,623 | B2 | 5/2010 | Wentz et al. |
| 7,736,057 | B2 | 6/2010 | Vanbost |
| 7,810,766 | B2 | 10/2010 | Blessman |
| 7,815,153 | B2 | 10/2010 | Campbell et al. |
| D633,268 | S | 2/2011 | Bottita |
| D639,519 | S | 6/2011 | Gomez |
| 8,020,686 | B2 | 9/2011 | Babineau et al. |
| D648,912 | S | 11/2011 | Cantu |
| D699,014 | S | 2/2014 | Lohrke et al. |
| 8,757,563 | B2 | 6/2014 | Muse |
| 8,840,072 | B2 | 9/2014 | Muse |
| 8,978,964 | B1 | 3/2015 | Ruggiere, Sr. |
| 9,056,715 | B2 | 6/2015 | Muse |
| 9,102,432 | B2 | 8/2015 | Muse |
| D738,743 | S | 9/2015 | Galmarini |
| 9,352,870 | B2 | 5/2016 | Muse |
| 9,517,884 | B2 | 12/2016 | Muse |
| 9,550,623 | B2 | 1/2017 | Muse |
| D785,463 | S | 5/2017 | Akana et al. |
| 9,701,470 | B2 | 7/2017 | Muse |
| 9,896,266 | B2 | 2/2018 | Muse |
| D860,000 | S | 9/2019 | Baldelomar Bernardin |
| 10,563,346 | B2 | 2/2020 | Barre et al. |
| D899,723 | S | 10/2020 | Boyea |
| D900,629 | S | 11/2020 | Milos |
| D909,211 | S | 2/2021 | Bornmiller et al. |
| D919,432 | S | 5/2021 | Muse et al. |
| D929,238 | S | 8/2021 | Chen et al. |
| D935,124 | S | 11/2021 | Chen et al. |
| D941,677 | S | 1/2022 | Chen et al. |
| D956,494 | S | 7/2022 | Chen et al. |
| D957,081 | S | 7/2022 | Chen et al. |
| 11,634,277 | B2 | 4/2023 | Chen et al. |
| D984,867 | S | 5/2023 | Chen et al. |
| D985,224 | S | 5/2023 | Chen et al. |
| 11,851,272 | B2 | 12/2023 | Chen et al. |
| 11,858,729 | B2 | 1/2024 | Chen et al. |
| D1,017,174 | S | 3/2024 | Chen et al. |
| 11,958,685 | B2 | 4/2024 | Chen et al. |
| D1,054,263 | S | 12/2024 | Chen et al. |
| 12,172,829 | B2 | 12/2024 | Chen et al. |
| 2002/0074247 | A1 | 6/2002 | Tremblay |
| 2002/0130224 | A1 | 9/2002 | Asaro |
| 2003/0173471 | A1 | 9/2003 | Weathers et al. |
| 2003/0218104 | A1 | 11/2003 | Klotz |
| 2004/0026578 | A1 | 2/2004 | King et al. |
| 2006/0011785 | A1 | 1/2006 | McLean |
| 2006/0032991 | A1 | 2/2006 | Gaines |
| 2006/0144467 | A1 | 7/2006 | Butzer |
| 2006/0273143 | A1 | 12/2006 | Finch |
| 2008/0023595 | A1 | 1/2008 | Armaly, Jr. |
| 2008/0128479 | A1 | 6/2008 | Bates et al. |
| 2008/0134981 | A1 | 6/2008 | Selenke et al. |
| 2009/0121502 | A1 | 5/2009 | Lau |
| 2010/0108826 | A1 | 5/2010 | Fernandez et al. |
| 2010/0111447 | A1 | 5/2010 | Vergo |
| 2010/0142860 | A1 | 6/2010 | Mincozzi |
| 2010/0237202 | A1 | 9/2010 | Mincozzi |
| 2010/0243650 | A1 | 9/2010 | Manley |
| 2010/0276247 | A1 | 11/2010 | Babineau et al. |
| 2011/0011921 | A1 | 1/2011 | Sorensen |
| 2011/0309208 | A1 | 12/2011 | Muse |
| 2011/0309209 | A1 | 12/2011 | Muse |
| 2011/0309210 | A1 | 12/2011 | Muse |
| 2012/0110959 | A1 | 5/2012 | Serago, Jr. |
| 2013/0019995 | A1 | 1/2013 | Muse |
| 2013/0020449 | A1 | 1/2013 | Muse |
| 2013/0092726 | A1 | 4/2013 | McMahon |
| 2013/0140308 | A1 | 6/2013 | Stowers |
| 2013/0156350 | A1 | 6/2013 | Turner |
| 2014/0190850 | A1 | 7/2014 | Glass et al. |
| 2014/0331616 | A1 | 11/2014 | Muse |
| 2014/0339379 | A1 | 11/2014 | Muse |
| 2015/0232222 | A1 | 8/2015 | Muse |
| 2015/0291354 | A1 | 10/2015 | Muse |
| 2016/0001975 | A1 | 1/2016 | Muse |
| 2016/0236864 | A1 | 8/2016 | Muse |
| 2016/0244243 | A1 | 8/2016 | Durrow |
| 2017/0057699 | A1 | 3/2017 | Lin |
| 2017/0088350 | A1 | 3/2017 | Muse |
| 2017/0275095 | A1 | 9/2017 | Muse |
| 2018/0022546 | A1* | 1/2018 | Wells .................... B65F 1/1615 229/247 |
| 2021/0070541 | A1 | 3/2021 | Chen et al. |
| 2021/0070542 | A1 | 3/2021 | Chen et al. |
| 2023/0089585 | A1 | 3/2023 | Chen et al. |
| 2023/0166906 | A1 | 6/2023 | Chen et al. |
| 2023/0174299 | A1 | 6/2023 | Chen et al. |
| 2024/0208722 | A1 | 6/2024 | Chen et al. |
| 2024/0208723 | A1 | 6/2024 | Chen et al. |

FOREIGN PATENT DOCUMENTS

| | | | |
|---|---|---|---|
| DE | 202013007170 | 11/2013 | |
| FR | 2687641 | 8/1993 | |
| JP | 2004024200 | 1/2004 | |
| WO | WO-2007029272 A1 * | 3/2007 | ............ B65D 33/02 |
| WO | 2016182492 | 11/2016 | |
| WO | WO-2016182492 A1 * | 11/2016 | |

OTHER PUBLICATIONS

Muse, John Richard; Applicant Initiated Interview Summary for U.S. Appl. No. 13/164,464, filed Jun. 20, 2011, mailed Mar. 11, 2014, 5 pgs.

Muse, John Richard; Final Office Action for U.S. Appl. No. 13/164,464, filed Jun. 20, 2011, mailed Jan. 10, 2014, 8 pgs.

Muse, John Richard; Final Office Action for U.S. Appl. No. 13/164,464, filed Jun. 20, 2011, mailed Sep. 23, 2013, 8 pgs.

Muse, John Richard; Final Office Action for U.S. Appl. No. 13/164,464, filed Jun. 20, 2011; mailed Feb. 22, 2013, 6 pgs.

Muse, John Richard; Issue Notification for U.S. Appl. No. 13/164,464, filed Jun. 20, 2011, mailed Sep. 3, 2014, 1 pg.

Muse, John Richard; Non-Final Office Action for U.S. Appl. No. 13/164,464, filed Jun. 20, 2011, mailed May 29, 2013, 12 pgs.

Muse, John Richard; Non-Final Office Action for U.S. Appl. No. 13/164,464, filed Jun. 20, 2011; mailed Nov. 16, 2012, 17 pgs.

Muse, John Richard; Notice of Allowance for U.S. Appl. No. 13/164,464, filed Jun. 20, 2011, mailed Apr. 29, 2014, 11 pgs.

Muse, John Richard; Restriction Requirement for U.S. Appl. No. 13/164,464, filed Jun. 20, 2011, mailed Oct. 19, 2012; 6 pgs.

Muse, John Richard; Non-Final Office Action for U.S. Appl. No. 14/447,043, filed Jul. 30, 2014, mailed Mar. 31, 2015, 32 pgs.

(56) References Cited

OTHER PUBLICATIONS

Muse, John Richard; Notice of Allowance for U.S. Appl. No. 14/447,043, filed Jul. 30, 2014, mailed Jul. 23, 2015, 12 pgs.
Muse, John Richard; Corrected Notice of Allowability for U.S. Appl. No. 14/447,058, filed Jul. 30, 2014, mailed Jul. 8, 2015, 4 pgs.
Muse, John Richard; Issue Notification for U.S. Appl. No. 14/447,058, filed Jul. 30, 2014, mailed Jul. 22, 2015, 1 pg.
Muse, John Richard; Notice of Allowance for U.S. Appl. No. 14/447,058, filed Jul. 30, 2014, mailed Mar. 30, 2015, 34 pgs.
Muse, John Richard; Non-Final Office Action for U.S. Appl. No. 14/748,772, filed Jun. 24, 2015, mailed Oct. 2, 2015, 30 pgs.
Muse, John Richard; Applicant Initiated Interview Summary for U.S. Appl. No. 13/164,473, filed Jun. 20, 2011, mailed Dec. 2, 2013, 3 pgs.
Muse, John Richard; Final Office Action for U.S. Appl. No. 13/164,473, filed Jun. 20, 2011, mailed Dec. 13, 2013, 28 pgs.
Muse, John Richard; Issue Notification for U.S. Appl. No. 13/164,473, filed Jun. 20, 2011, mailed Jun. 4, 2014, 1 pg.
Muse, John Richard; Notice of Allowance for U.S. Appl. No. 13/164,473, filed Jun. 20, 2011, mailed Mar. 13, 2014, 12 pgs.
Muse, John Richard; Supplemental Notice of Allowability for U.S. Appl. No. 13/164,473, filed Jun. 20, 2011, mailed May 27, 2014, 6 pgs.
Muse, John; Final Office Action for U.S. Appl. No. 13/164,473, filed Jun. 20, 2011, mailed Mar. 13, 2013, 16 pgs.
Muse; Non-Final Office Action for U.S. Appl. No. 13/164,473, filed Jun. 20, 2011, mailed Dec. 3, 2012; 19 pgs.
Muse; Non-Final Office Action for U.S. Appl. No. 13/164,473, filed Jun. 20, 2011, mailed Jun. 25, 2013, 14 pgs.
Muse, John Richard; Final Office Action for U.S. Appl. No. 13/164,481, filed Jun. 20, 2011, mailed Apr. 5, 2013, 17 pgs.
Muse, John Richard; Non-Final Office Action for U.S. Appl. No. 13/164,481, filed Jun. 20, 2011, mailed Dec. 5, 2012; 18 pgs.
Muse, John Richard; Notice of Allowance for U.S. Appl. No. 13/164,481, filed Jun. 20, 2011, mailed Oct. 23, 2013, 11 pgs.
Muse; Non-Final Office Action for U.S. Appl. No. 13/164,481, filed Jun. 20, 2011, mailed Jul. 11, 2013, 11 pgs.
Muse, John Richard; Advisory Action for U.S. Appl. No. 13/551,575, filed Jul. 17, 2012, mailed Dec. 4, 2014, 3 pgs.
Muse, John Richard; Applicant-Initiated Interview Summary for U.S. Appl. No. 13/551,575, filed Jul. 17, 2012, mailed Dec. 19, 2014, 3 pgs.
Muse, John Richard; Final Office Action for U.S. Appl. No. 13/551,575, filed Jul. 17, 2012, Mailed Sep. 30, 2014, 22 pgs.
Muse, John Richard; Issue Notification for U.S. Appl. No. 13/551,575, filed Jul. 17, 2012, mailed May 27, 2015, 1 pg.
Muse, John Richard; Non-Final Office Action for U.S. Appl. No. 13/551,575, filed Jul. 17, 2012, mailed Dec. 6, 2013, 45 pgs.
Muse, John Richard; Non-Final Office Action for U.S. Appl. No. 13/551,575, filed Jul. 17, 2012, mailed May 16, 2014, 12 pgs.
Muse, John Richard; Notice of Allowance for U.S. Appl. No. 13/551,575, filed Jul. 17, 2012, mailed Feb. 2, 2015, 12 pgs.
Muse, John Richard; Advisory Action for U.S. Appl. No. 14/701,022, filed Apr. 30, 2015, mailed Jan. 21, 2016, 4 pgs.
Muse, John Richard; Applicant Interview Summary for U.S. Appl. No. 14/701,022, filed Apr. 30, 2015, mailed Dec. 22, 2015, 3 pgs.
Muse, John Richard; Final Office Action for U.S. Appl. No. 14/701,022, filed Apr. 30, 2015, mailed Oct. 22, 2015, 27 pgs.
Muse, John Richard; Issue Notification for U.S. Appl. No. 14/701,022, filed Apr. 30, 2015, mailed May 11, 2016, 1 pg.
Muse, John Richard; Non-Final Office Action for U.S. Appl. No. 14/701,022, filed Apr. 30, 2015, mailed Jun. 3, 2015, 12 pgs.
Muse, John Richard; Notice of Allowance for U.S. Appl. No. 14/701,022, filed Apr. 30, 2015, mailed Feb. 8, 2016, 12 pgs.
Muse, John Richard; Issue Notification for U.S. Appl. No. 15/139,375, filed Apr. 27, 2016, mailed Jan. 4, 2017; 1 pg.
Muse, John Richard; Notice of Allowance for U.S. Appl. No. 15/139,375, filed Apr. 27, 2016; mailed Sep. 28, 2016; 35 pgs.
Muse, John, R.; Applicant Initiated Interview Summary for U.S. Appl. No. 15/139,375, filed Apr. 27, 2016, mailed Jun. 6, 2016, 3 pgs.
Muse, John Richard; Issue Notification for U.S. Appl. No. 15/373,103, filed Dec. 8, 2016, mailed Jun. 21, 2017; 1 page.
Muse, John Richard; Non-final Office Action for U.S. Appl. No. 15/373,103, filed Dec. 8, 2016, mailed Feb. 7, 2017; 9 pgs.
Muse, John Richard; Notice of Allowance for U.S. Appl. No. 15/373,103, filed Dec. 8, 2016, mailed Mar. 16, 2017; 6 pgs.
Muse, John Richard, Notice of Allowance for U.S. Appl. No. 14/854,777, filed Sep. 15, 2015, mailed Sep. 19, 2016, 10 pgs.
Muse, John Richard; Advisory Action for U.S. Appl. No. 14/854,777, filed Sep. 15, 2015, mailed Jul. 25, 2016, 3 pgs.
Muse, John Richard; Applicant Initiated Interview Summary for U.S. Appl. No. 14/854,777, filed Sep. 15, 2015, mailed Jun. 16, 2016, 3 pgs.
Muse, John Richard; Applicant-Initiated Interview Summary for U.S. Appl. No. 14/854,777, filed Sep. 15, 2015, mailed Aug. 26, 2016; 3 pgs.
Chen, Shifeng; Final Office Action for U.S. Appl. No. 18/051,746, filed Nov. 1, 2022, mailed May 31, 2023, 8 pgs.
Chen, Shifeng; Non-Final Office Action for U.S. Appl. No. 18/103,235, filed Jan. 30, 2023, mailed May 17, 2023, 50 pgs.
Chen, Shifeng; Non-Final Office Action for U.S. Appl. No. 18/103,508, filed Jan. 31, 2023, mailed May 17, 2023, 46 pgs.
Muse, John Richard; Final Office Action for U.S. Appl. No. 14/854,777, filed Sep. 15, 2015, mailed Jun. 24, 2016, 12 pgs.
Muse, John Richard; Issue Notification for U.S. Appl. No. 14/854,777, filed Sep. 15, 2015, mailed Nov. 22, 2016; 1 pg.
Muse, John Richard; Non-Final Office Action for U.S. Appl. No. 14/854,777, filed Sep. 15, 2015, mailed Dec. 22, 2015, 38 pgs.
Muse, John Richard; Issue Notification for U.S. Appl. No. 15/615,895, filed Jun. 7, 2017, mailed Jan. 31, 2018, 1 pg.
Muse, John Richard; Notice of Allowance for U.S. Appl. No. 15/615,895, filed Jun. 7, 2017, mailed Dec. 8, 2017, 13 pgs.
Muse; Non-Final Office Action U.S. Appl. No. 15/615,895, filed Jun. 7, 2017, mailed Sep. 14, 2017; 38 pgs.
Muse, John Richard; Final Office Action for U.S. Appl. No. 13/551,583, filed Jul. 17, 2012, mailed Dec. 31, 2014, 16 pgs.
Muse, John Richard; Non-Final Office Action for U.S. Appl. No. 13/551,583, filed Jul. 17, 2012, mailed Jul. 15, 2014, 38 pgs.
Muse, John Richard; Non-Final Office Action for U.S. Appl. No. 13/551,583, filed Jul. 17, 2012, mailed Apr. 1, 2015, 12 pgs.
Muse, John Richard; Notice of Allowance for U.S. Appl. No. 13/551,583, filed Jul. 17, 2012, mailed Sep. 28, 2015, 13 pgs.
Muse, John Richard; Supplemental Notice of Allowability for U.S. Appl. No. 13/551,583, filed Jul. 17, 2012, mailed Oct. 15, 2015, 5 pgs.
alibaba.com; Article entitled: "Heavy Duty 32 Gallon Reusable Collapsible Yard Waste Container", publicly available prior to Aug. 19, 2019, 4 pgs.
Chen, Shifeng; Final Office Action for U.S. Appl. No. 16/703,272, filed Dec. 4, 2019, mailed Oct. 28, 2022, 19 pgs.
Chen, Shifeng; Final Office Action for U.S. Appl. No. 16/703,272, filed Dec. 4, 2019, mailed Feb. 18, 2022, 14 pgs.
Chen, Shifeng; Non-Final Office Action for U.S. Appl. No. 16/703,272, filed Dec. 4, 2019, mailed Feb. 9, 2023, 19 pgs.
Chen, Shifeng; Non-Final Office Action for U.S. Appl. No. 16/703,272, filed Dec. 4, 2019, mailed May 20, 2022, 19 pgs.
Chen, Shifeng; Non-Final Office Action for U.S. Appl. No. 16/703,272, filed Dec. 4, 2019, mailed Sep. 17, 2021, 49 pgs.
donthuntmenow.club; Article entitled: "Paper Leaf Bag", Dec. 1, 2018, 23 pgs.
knowledgeboard.co; Article entitled: "Leaf Bag Holder", Apr. 21, 2019, 23 pgs.
The Home Depot; Article entitled: "Leaf Easy Plastic Leaf and Lawn Chute", publicly available prior to Aug. 19, 2019, 3 pgs.
Chen, Shifeng; Non-Final Office Action for U.S. Appl. No. 16/703,184, filed Dec. 4, 2019, mailed Jan. 14, 2022, 49 pgs.
Chen, Shifeng; Non-Final Office Action for U.S. Appl. No. 16/703,184, filed Dec. 4, 2019, mailed May 27, 2022, 12 pgs.
Chen, Shifeng; Notice of Allowance for U.S. Appl. No. 16/703,184, filed Dec. 4, 2019, mailed Nov. 3, 2022, 17 pgs.

(56) References Cited

OTHER PUBLICATIONS

Chen, Shifeng; Notice of Allowance for U.S. Appl. No. 16/703,184, filed Dec. 4, 2019, mailed Mar. 15, 2023, 11 pgs.
Chen, Shifeng; Requirement for Restriction/Election for U.S. Appl. No. 16/703,184, filed Dec. 4, 2019, mailed Dec. 3, 2021, 6 pgs.
Chen, Shifeng; Non-Final Office Action for U.S. Appl. No. 18/051,746, filed Nov. 1, 2022, mailed Feb. 14, 2023, 42 pgs.
Chen, Shifeng; Requirement for Restriction/Election for U.S. Appl. No. 18/051,746, filed Nov. 1, 2022, mailed Feb. 6, 2023, 8 pgs.
Chen, Shifeng; Corrected Notice of Allowance for Design U.S. Appl. No. 29/715,749, filed Dec. 4, 2019, mailed Jun. 8, 2021, 6 pgs.
Chen, Shifeng; Corrected Notice of Allowance for Design U.S. Appl. No. 29/715,749, filed Dec. 4, 2019, mailed Jul. 26, 2021, 6 pgs.
Chen, Shifeng; Notice of Allowance for Design U.S. Appl. No. 29/715,749, filed Dec. 4, 2019, mailed Apr. 21, 2021, 36 pgs.
Chen, Shifeng; Corrected Notice of Allowance for U.S. Appl. No. 29/800,663, filed Jul. 22, 2021, mailed Oct. 18, 2021, 34 pgs.
Chen, Shifeng; Notice of Allowance for U.S. Appl. No. 29/800,663, filed Jul. 22, 2021, mailed Oct. 4, 2021, 6 pgs.
Chen, Shifeng; Corrected Notice of Allowance for Design U.S. Appl. No. 29/715,742, filed Dec. 4, 2019, mailed Oct. 4, 2021, 6 pgs.
Chen, Shifeng; Corrected Notice of Allowance for U.S. Appl. No. 29/715,742, filed Dec. 4, 2019, mailed Aug. 31, 2021, 6 pgs.
Chen, Shifeng; Notice of Allowance for Design U.S. Appl. No. 29/175,742, filed Dec. 4, 2019, mailed Jun. 29, 2021, 42 pgs.
Chen, Shifeng; Notice of Allowance for Design U.S. Appl. No. 29/809,463, filed Sep. 28, 2021, mailed Feb. 24, 2022, 40 pgs.
Chen, Shifeng; Notice of Allowance for Design U.S. Appl. No. 29/809,466, filed Sep. 28, 2021, mailed Feb. 24, 2022, 39 pgs.
Google search Feb. 17, 2022, ebay.com, Jardineer garden leaf scoops yard, leaf grabber claws, https://www.ebay.com/tm/14441117 4223 (Year: 2022).
Chen, Shifeng; Notice of Allowance for U.S. Appl. No. 29/840,177, filed May 26, 2022, mailed Jan. 24, 2023, 52 pgs.
lowes.com retrieved Jan. 9, 2022, leafeasy46.75 inX15 in bag insert, https://www.lowes.com/pd/LeafEasy-46-in-x-16-75-in-Trash-Bag-Insert/50049703 (Year: 2022).
Lowes.com retrieved on Jan. 9, 2022, leafEasy 39 gallon outdoor plastic lawn and leaf trash bag, https://www.lowes.com/pd/LeafEasy-39-Gallon-Green-Plastic-Lawn-and-Leaf-Trash-Bag/1001315000 (Year: 2022).
Chen, Shifeng; Notice of Allowance for U.S. Appl. No. 29/840,178, filed May 26, 2022, mailed Jan. 25, 2023, 52 pgs.
Google search Jan. 9, 2023, ebay.com, Jardineer garden leaf scoops yard, leaf grabber claws, https://www.ebay.com/tm/364100256621 (Year: 2022).
Chen, Shifeng; Final Office Action for U.S. Appl. No. 16/703,272, filed Dec. 4, 2019, mailed Jul. 19, 2023, 23 pgs.
Chen, Shifeng; Non-Final Office Action for U.S. Appl. No. 18/051,746, filed Nov. 1, 2022, mailed Aug. 22, 2023, 18 pgs.
Chen, Shifeng; Non-Final Office Action for U.S. Appl. No. 16/703,272, filed Dec. 4, 2019, mailed Nov. 3, 2023, 20 pgs.
Chen, Shifeng; Notice of Allowance for U.S. Appl. No. 18/051,746, filed Nov. 1, 2022, mailed Dec. 11, 2023, 12 pgs.
Chen, Shifeng; Notice of Allowance for U.S. Appl. No. 18/103,235, filed Jan. 30, 2023, mailed Oct. 27, 2023, 16 pgs.
Chen, Shifeng; Notice of Allowance for U.S. Appl. No. 18/103,508, filed Jan. 31, 2023, mailed Oct. 18, 2023, 12 pgs.
Chen, Shifeng; Notice of Allowance for Design U.S. Appl. No. 29/886,422, filed Mar. 8, 2023, mailed Oct. 12, 2023, 49 pgs.
Chen, Shifeng; Final Office Action for U.S. Appl. No. 16/703,272, filed Dec. 4, 2019, mailed Feb. 29, 2024, 26 pgs.
Chen, Shifeng; Certificate of Correction for U.S. Appl. No. 18/103,235, filed Jan. 30, 2023, mailed Feb. 13, 2024, 1 pg.
Chen, Shifeng; Certificate of Correction for U.S. Appl. No. 18/103,508, filed Jan. 31, 2023, mailed Feb. 13, 2024, 1 pg.
Chen, Shifeng; Non-Final Office Action for U.S. Appl. No. 18/600,208, filed Mar. 8, 2024, mailed May 6, 2024, 9 pgs.
Chen, Shifeng; Non-Final Office Action for U.S. Appl. No. 18/600,227, filed Mar. 8, 2024, mailed May 7, 2024, 10 pgs.
Chen, Shifeng; Non-Final Office Action for U.S. Appl. No. 16/703,272, filed Dec. 4, 2019, mailed Jun. 7, 2024, 29 pgs.
Chen, Shifeng; Non-Final Office Action for U.S. Appl. No. 18/600,208, filed Mar. 8, 2024, mailed Aug. 16, 2024, 51 pgs.
Chen, Shifeng; Notice of Allowance for U.S. Appl. No. 18/600,227, filed Mar. 8, 2024, mailed Aug. 28, 2024, 49 pgs.
Chen, Shifeng; Notice of Allowance for Design U.S. Appl. No. 29/907,439, filed Jan. 5, 2024, mailed Aug. 7, 2024, 56 pgs.
Chen, Shifeng; Final Office Action for U.S. Appl. No. 16/703,272, filed Dec. 4, 2019, mailed Sep. 12, 2024, 14 pgs.
Chen, Shifeng; Advisory Action for U.S. Appl. No. 18/600,208, filed Mar. 8, 2024, mailed Oct. 25, 2024, 3 pgs.
Chen, Shifeng; Notice of Allowance for U.S. Appl. No. 16/703,272, filed Dec. 4, 2019, mailed Jan. 15, 2025, 9 pgs.,.
Chen, Shifeng; Non-Final Office Action for U.S. Appl. No. 18/600,208, filed Mar. 8, 2024, mailed Nov. 19, 2024, 17 pgs.,.
Chen, Shifeng; Final Office Action for U.S. Appl. No. 18/600,208, filed Mar. 8, 2024, mailed Feb. 27, 2025, 14 pgs.

* cited by examiner

LAWN REFUSE BAG

CROSS-REFERENCE TO RELATED APPLICATIONS

The present application is a continuation of U.S. application Ser. No. 16/703,272, filed Dec. 4, 2019, which claims priority to U.S. Provisional Application No. 62/896,935, filed Sep. 6, 2019, each of which is hereby specifically incorporated by reference herein in its entirety.

TECHNICAL FIELD

This disclosure relates to lawn refuse disposal. More specifically, this disclosure relates to a lawn refuse bag comprising a pair of handle assemblies.

BACKGROUND

Lawn refuse (e.g., leaves, grass clippings, dirt, sticks, etc.) is typically bagged for removal from a lawn. Lawn refuse bags define a cavity for receiving lawn refuse, and are often formed from a flexible material, such as paper or plastic, and are discarded along with the lawn refuse. However, flexible refuse bags can be prone to collapsing or tipping over, and can therefore be difficult to fill. Furthermore, a user's hands are typically occupied with carrying and dumping the lawn refuse in the cavity of the refuse bag, and cannot be used to provide needed support to the refuse bag.

Typically, closing the refuse bag after filling the refuse bag requires folding and rolling a top end of the refuse bag. As such, a sufficient amount of space must be left within the cavity at the top end of the refuse bag to facilitate closing the top end of the bag. A user must be aware of how much lawn refuse is in the refuse bag and take care not to fill the refuse bag too fully. In instances where the refuse bag is too full to close the top end, lawn refuse must be removed from the refuse bag to allow for proper closure.

SUMMARY

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts of the disclosure as an introduction to the following complete and extensive detailed description.

Disclosed is a lawn refuse bag comprising a bag body defining a top end and an interior cavity configured to receive lawn refuse, the top end defining a top opening, the top end configurable in an open orientation and a closed orientation; a first handle assembly coupled to the bag body at the top end; and a second handle assembly coupled to the bag body at the top end, wherein, in the closed orientation, the first handle assembly is configured to engage the second handle assembly, and in the open orientation, the first handle assembly is configured to disengage the second handle assembly.

Also disclosed is a method for using a lawn refuse bag, the method comprising providing a lawn refuse bag comprising a bag body, a first handle assembly, and a second handle assembly, the bag body defining an interior cavity and a top end, the top end defining a top opening; inserting lawn refuse into the interior cavity through the top opening; and tying a first handle portion of the first handle assembly with a second handle portion of the second handle assembly to orient the top end in a closed orientation.

Additionally, disclosed is a lawn refuse bag comprising a lawn bag body defining a top end and an interior cavity, the top end defining a top lawn bag opening, the lawn refuse bag configured to receive lawn refuse in the interior cavity through the top lawn bag opening in an open orientation of the lawn refuse bag; a first lawn bag handle assembly coupled to the lawn bag body at the top end; and a second lawn bag handle assembly coupled to the lawn bag body at the top end; wherein the lawn bag body defines a height and a width, and wherein the lawn bag body defines a height-to-width ratio in the open orientation of about 1.6.

Disclosed also is a lawn refuse bag comprising a lawn bag body defining a top end, a bottom end, and an interior cavity, the lawn bag body comprising a base panel at the bottom end and a sidewall enclosure extending from the base panel to the top end, the top end defining a top lawn bag opening, the lawn refuse bag configured to receive lawn refuse in the interior cavity through the top lawn bag opening; a first lawn bag handle assembly coupled to the lawn bag body at the top end; and a second lawn bag handle assembly coupled to the lawn bag body at the top end; wherein the base panel of the lawn bag body defines a width and a depth, and wherein an area of the base panel is at least about 252 square inches.

Furthermore, disclosed is a lawn refuse bag comprising a lawn bag body defining a top end and an interior cavity, the top end defining a top lawn bag opening, the lawn refuse bag configured to receive lawn refuse in the interior cavity through the top lawn bag opening in an open orientation of the lawn refuse bag; a first lawn bag handle assembly coupled to the lawn bag body at the top end; and a second lawn bag handle assembly coupled to the lawn bag body at the top end; wherein a volume of the lawn bag body in the open orientation is at least about 7,308 cubic inches.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Figure 1A:
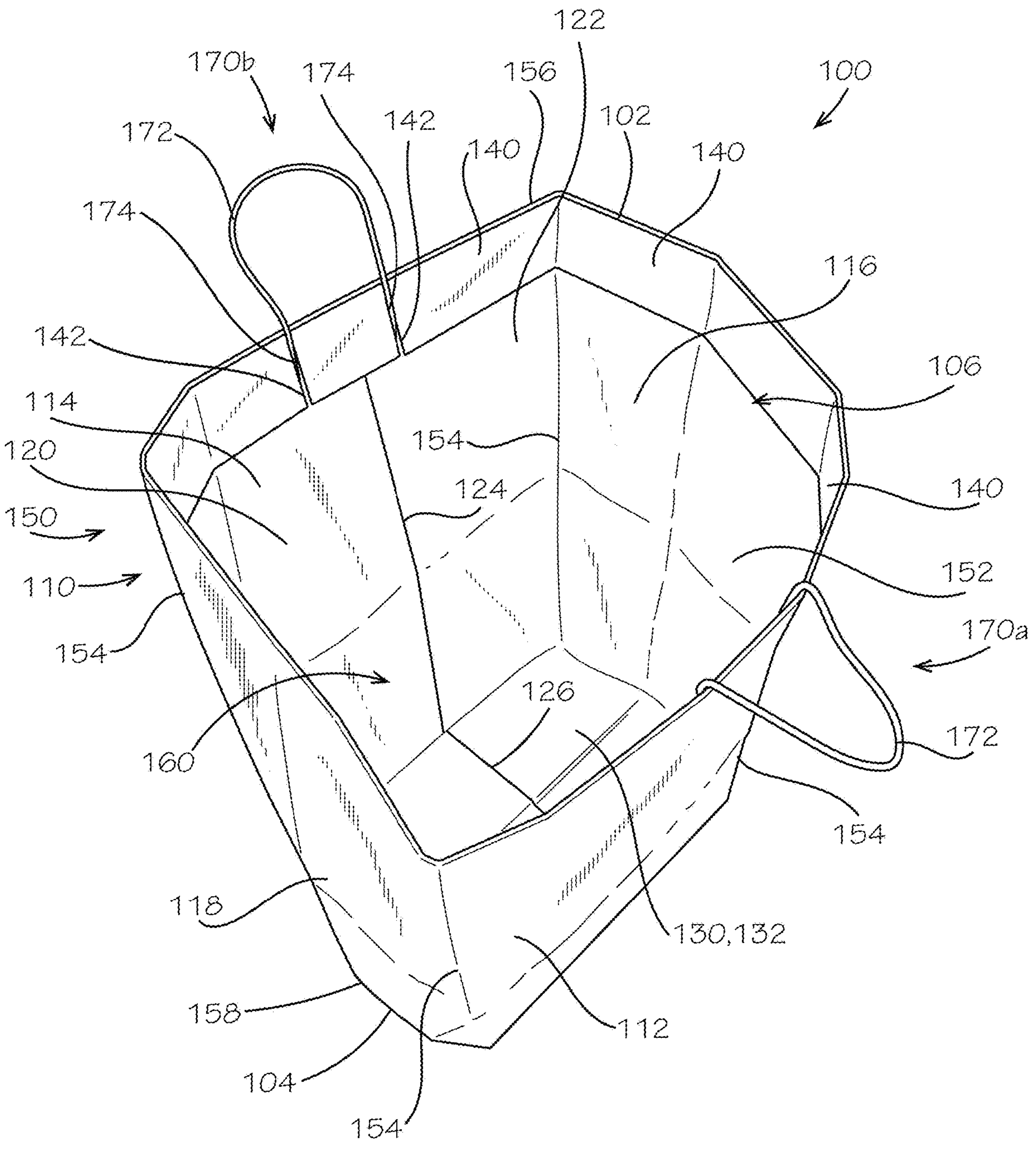
FIG. 1A is a top perspective view of a lawn refuse bag in an upright, open, and assembled orientation, in accordance with one aspect of the present disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutations of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed in the present application is a lawn refuse bag and associated methods, systems, devices, and various apparatus. Example aspects of the lawn refuse bag can comprise a bag body defining a top end and a pair of handle assemblies coupled to the bag body at the top end. It would be understood by one of skill in the art that the disclosed refuse bag is described in but a few exemplary aspects among many. No particular terminology or description should be considered limiting on the disclosure or the scope of any claims issuing therefrom.

FIG. 1A illustrates a first aspect of a lawn refuse bag 100 according to the present disclosure. The lawn refuse bag 100 is depicted in an upright, assembled, and unfolded orientation, such that it is ready for use. As shown, the lawn refuse bag 100 can comprise a bag body 110 and a pair of handle assemblies 170*a*, 170*b* extending from the bag body 110. Example aspects of the bag body 110 can be formed from a single bag blank 200 (shown in FIG. 2); however, in other aspects, the bag body 110 can be formed from multiple bag blanks. As shown, the bag body 110 can comprise a front sidewall panel 112, a rear sidewall panel 114, a right sidewall panel 116, and a left sidewall panel 118. Example aspects of the rear sidewall panel 114 can define a first rear sidewall subpanel 120 and a second rear sidewall subpanel 122 which can be joined together to retain the lawn refuse bag 100 in the assembled orientation, as shown. In various aspects, a joining seam 124 can be formed where the first rear sidewall subpanel 120 can be joined with the second rear sidewall subpanel 122. In other aspects, the joining seam 124 can be formed elsewhere on the side or end panels.

For example, in another aspect, the front sidewall panel 112 may define first and second front sidewall subpanels that can be joined together to retain the lawn refuse bag 110 in the assembled orientation and to define the joining seam 124. In another example aspect, the joining seam 124 may be formed between any pair of adjacent panels, such as, for example, between the left sidewall panel 118 and the rear sidewall panel 120.

According to example aspects, the front sidewall panel 112, rear sidewall panel 114, right sidewall panel 116, and left sidewall panel 118 can define a sidewall enclosure 150 of the bag body 110 in the assembled orientation. An inner sidewall surface 152 of the sidewall enclosure 150 can define an interior cavity 160, as shown, which can be configured to receive lawn refuse (e.g., grass clippings, dirt, sticks, leaves, etc.), as described in further detail below. Example aspects of the sidewall enclosure 150, such as the aspect depicted in FIG. 1A, can define a substantially rectangular cross-section. However, other aspects of the bag body 110 can define any other suitable cross-sectional shape, such as, for example, a square, circle, triangle, pentagon, and the like. As shown, the sidewall enclosure 150 can define four vertical corners 154, relative to the orientation shown, wherein each of the vertical corners 154 can be defined at an intersection of adjacent sidewall panels 112, 114, 116, 118.

According to example aspects, the bag body 110 can define a top end 102, relative to the orientation shown, at a first end 156 of the sidewall enclosure 150, and a bottom end 104, relative to the orientation shown, at a second end 158 of the sidewall enclosure 150 opposite the first end 156. Example aspects of the bag body 110 can further comprise a base panel, such as a bottom panel 130, positioned at the bottom end 104 of the bag body 110 and oriented about perpendicular to the sidewall panels 112, 114, 116, 118. The bottom panel 130 can extend fully between the sidewall panels 112, 114, 116, 118, such that the bottom end 104 of the bag body 110 can be closed and access to the interior cavity 160 can be prohibited at the bottom end 104. As such, an inner bottom panel surface 132 of the bottom panel 130 can further define the interior cavity 160. However, as shown, the top end 102 of the bag body 110 can define a top opening 106 that can allow access to the interior cavity 160. In the present aspect, the top end 102 of the bag body 110 can be oriented in an open orientation, wherein lawn refuse can be inserted into the interior cavity 160 through the top opening 106 of the bag body 110. The top end 102 of the bag body 110 can also be oriented in a closed orientation, as further shown and described with respect to FIGS. 5 and 6. According to example aspects, in the upright and assembled orientation, as shown, the bottom panel 130 of the lawn refuse bag 100 can be configured to rest on a ground surface (e.g., a lawn or yard). Example aspects of the bottom panel 130 can be substantially flat and can provide suitable dimensions for providing a stable base for the lawn refuse bag 100, which can aid in preventing the lawn refuse bag 100 from tipping over from the desired upright orientation. The lawn refuse bag 100 can further be sized to allow a substantial amount of lawn refuse to be received within the interior cavity 160. Moreover, the top opening 106 of the bag body 110 can be dimensioned to allow a substantially sized cluster of lawn refuse to be inserted therethrough into the lawn refuse bag 100.

Various example aspects of the bag body 110 can comprise a substantially flexible material, such as paper, as shown. In some aspects, the bag body 110 can comprise a single layer of paper, while in other aspects, the bag body 110 can comprise a double layer of paper. In aspects comprising a double layer of paper, the stiffness and strength of the bag body 110 can be increased. Other aspects of the bag body 110 can comprise any other suitable number of layers. Furthermore, other aspects of the bag body 110 can define any other suitable flexible material, such as, for example, flexible plastic, fabric, or any other suitable flexible material or combination thereof. However, still other aspects of the bag body 110 can define a more rigid material, such as, for example, paperboard, polymer, metal, wood, composite, or any other suitable material or combination thereof. In some aspects, the inner sidewall surface 152 and/or inner bottom panel surface 132 can comprise a coating, such as, for example, a water resistant coating. Other aspects of the lawn refuse bag 100 may not comprise such a coating.

According to example aspects, each of the handle assemblies 170*a*, 170*b* can comprise a handle portion 172 and a connection portion 174. The connection portion 174 can be coupled to the lawn refuse bag 100 and the handle portion 172 can extend away from the lawn refuse bag 100, as shown. In the present aspect, each handle assembly 170*a*, 170*b* can generally define an inverted U-shape, relative to the orientation shown, wherein the connection portion 174 can define the ends of the U-shape and the handle portion 172 can define the middle of the U-shape. As shown, a first one of the handle assemblies 170*a* can be coupled with the front sidewall panel 112 and a second one of the handle assemblies 170*b* can be coupled with the rear sidewall panel 114. Referring to the second handle assembly 170*b*, the connection portion 174 can be secured to the rear sidewall panel 114 to attach the handle assembly 170*b* to the lawn refuse bag 100, and the handle portion 172 can extend away from the top end 102 of the bag body 110 proximate the top opening 106. The connection portion 174 can be secured to the rear sidewall panel 114 on the inner sidewall surface 152 by a fastener, such as, for example, an adhesive, such as tape or glue. In other aspects, any other suitable type of fastener known in the art can be used. The first handle assembly 170*a* can be similarly formed and secured to the front sidewall panel 112.

In example aspects, such as the aspect depicted in FIG. 1A, the handle assemblies 170*a*, 170*b* can be formed from twisted paper cord. Twisted paper cord can be made from paper that can be tightly twisted, and in some cases can define a crinkle texture, such that the strength and thickness of the paper can be increased. The increased strength and thickness of the handle assemblies 170*a*, 170*b* can allow the lawn refuse bag 100 to be carried by the handle assemblies 170*a*, 170*b* even when weighted down by lawn refuse. In other aspects, the handle assemblies 170*a*, 170*b* can be formed from any other suitable material known in that art having a sufficient strength to allow for carrying the bag in weighted conditions. Furthermore, according to some example aspects, a flexible wire (not shown) or other similar reinforcing structure can extend through each of the handle assemblies 170*a*, 170*b* to supply additional strength and stiffness to the handle assemblies 170*a*, 170*b*.

According to example aspects, one or more top flap segments 140 can extend from the top end 102 of the bag body 110. For example, in the present aspect, each of the sidewall panels 112, 114, 116, 118 can comprise a corresponding top flap segment 140 extending from the first end 156 of the sidewall enclosure 150. Each of the top flap segments 140 can be folded inward about 180° relative to the corresponding sidewall panel 112, 114, 116, 118, such that the top flap segments 140 can lie against the inner sidewall surface 152 of the sidewall enclosure 150. The top flap segments 140 can be secured to the corresponding sidewall panels 112, 114, 116, 118 by a fastener, such as, for example, an adhesive, such as tape or glue. In other aspects, any other suitable fastener known in the art can secure the top flap segments 140 to the inner sidewall surface 152. In some aspects, as shown, one or more slits 142 can be formed in the top flap segments 140 extending from the front and rear sidewall panels 112, 114 to accommodate folding the top flap segments 140 around the corresponding handle assemblies 170*a*, 170*b*. For example, in the present aspect, the corresponding top flap segments 140 can comprise a pair of the slits 142 which can be configured to receive corresponding portions of the corresponding handle assembly 170*a*, 170*b* therein. In some aspects, the top flap segments 140 of the front and rear sidewall panels 112, 114 can partially overlay the corresponding handle assembly 170*a,b*, and the connection portions 174 can be secured between the top flap segment 140 and the corresponding front or rear sidewall panel 112, 114. The second handle assembly 170*b* is shown and described in further detail with reference to FIG. 1B.

Furthermore, in some aspects, a first reinforcement strip (not shown) can be received between the bag body 110 and a corresponding one of the top flap segments 140 for granting added structure to the bag body 110 at the top end 102 thereof. Example aspects of the first reinforcement strip can be more rigid that the bag body 110. For example, in a particular aspect, the first reinforcement strip can be a substantially rectangular piece of paperboard. In the present aspect, the first reinforcement strip can be received between the front sidewall panel 112 and the corresponding top flap where the connection portion 174 of the first handle assembly 170*a* can be attached. As such, the first reinforcement strip can also serve to reinforce the first handle assembly 170*a*. According to example aspects, a second reinforcement strip (not shown) may also be providing for granting added structure to the rear sidewall panel 114 where the second handle assembly 170*b* can be attached. Moreover, in other aspects, reinforcement strips may also be provided between each of the right and left sidewall panels 116, 118 and the corresponding top flap segments 140.

In the present aspect, the lawn refuse bag 100 is in an open orientation wherein the top opening 106 can be fully open and access to the interior cavity 160 through the top opening 106 can be unrestricted. The handle assemblies 170*a*, 170*b* can be disengaged from one another in the open orientation, as shown. According to example aspects, the lawn refuse bag 100 can also be oriented in a closed orientation (shown in FIG. 5), wherein the handle portions 172 of the handle assemblies 170*a*, 170*b* can be engaged with one another (for example, tied together) to close or partially close the top opening 106 of the lawn refuse bag 100. In the closed orientation, the lawn refuse received within the interior cavity 160 can be prevented from escaping the interior cavity 160 and additional lawn refuse can be prevented from insertion into the interior cavity 160. The closed orientation and the method for tying the handle assemblies 170*a*, 170*b* together are shown and described in further detail with reference to FIGS. 5 and 6.

Figure 1B:
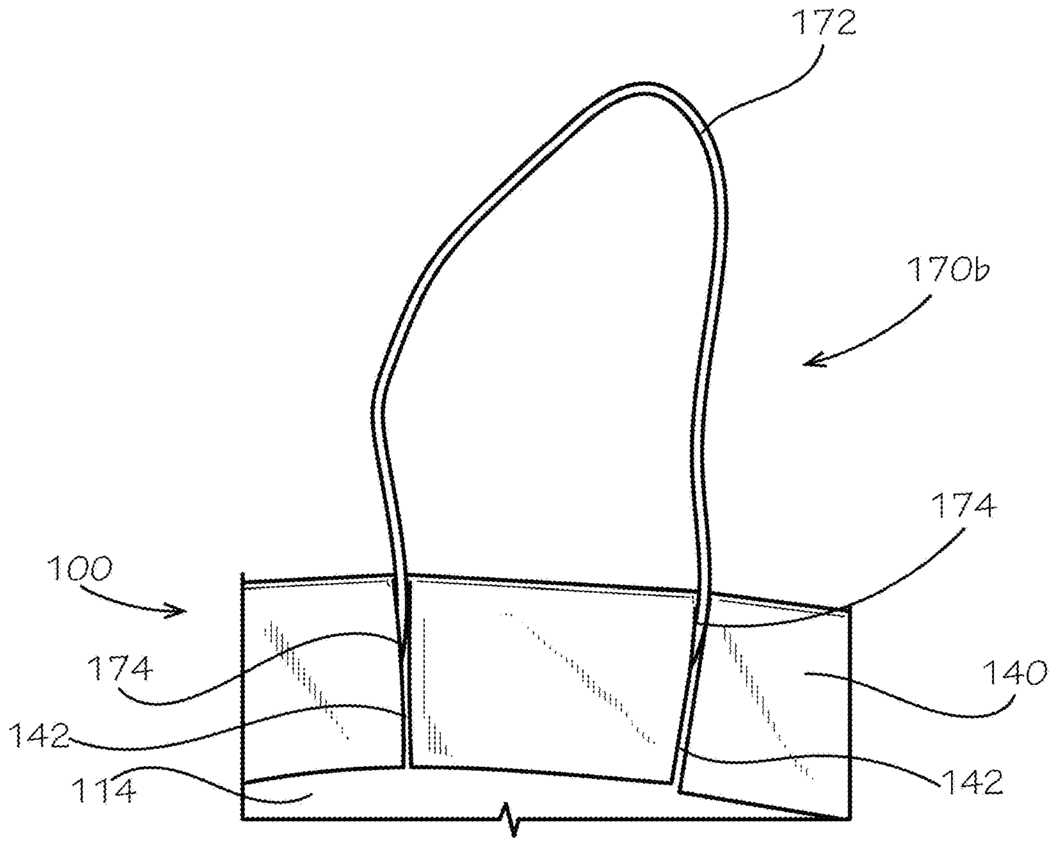
FIG. 1B is a detail view of a handle assembly of the lawn refuse bag of FIG. 1.
Figure 1C:
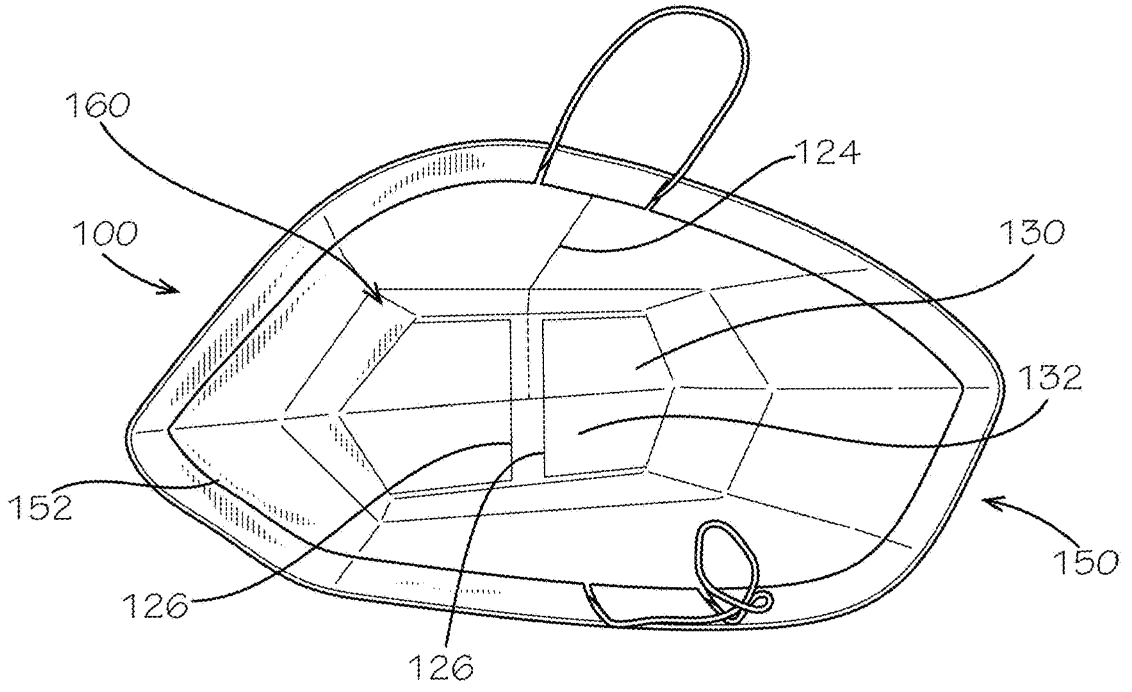
FIG. 1C is a top view of the lawn refuse bag of FIG. 1A.
Figure 1D:
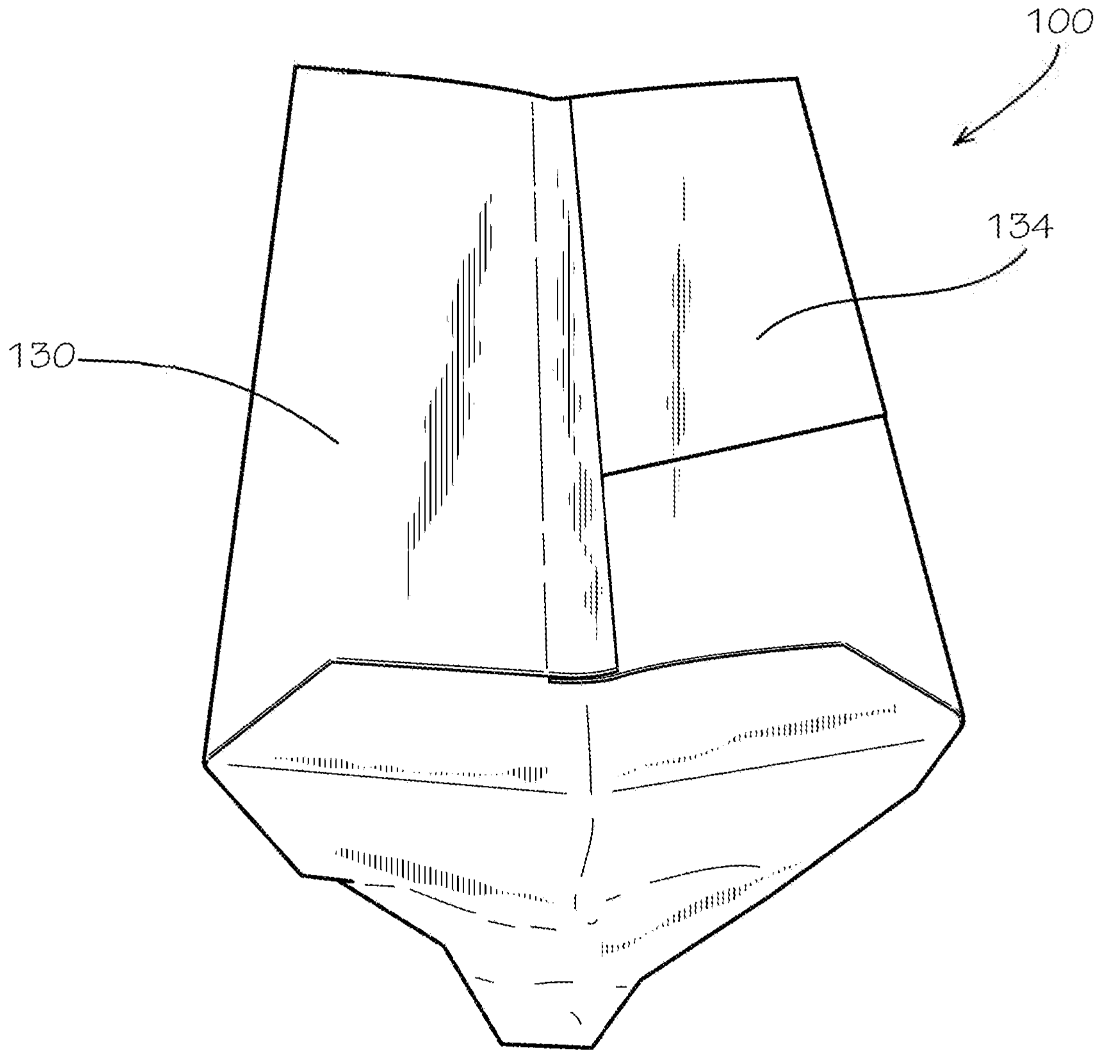
FIG. 1D is a bottom perspective view of the lawn refuse bag of FIG. 1A.

FIG. 1B is a close-up view of the second handle assembly 170*b* attached to the rear sidewall panel 114 of the lawn refuse bag 100. As shown, the corresponding top flap segment 140 is folded inward to lie against the rear sidewall panel 114 and can partially overlay the connection portions 174. FIG. 1C is top view of the lawn refuse bag 100, illustrating the inner sidewall surface 152 of the sidewall enclosure 150 and the interior cavity 160 for receiving the lawn refuse. The inner bottom panel surface 132 of the bottom panel 130, according to one particular example aspect of the lawn refuse bag 100, is also illustrated. As shown, the bottom panel 130 can be folded to form various bottom panel seams 126 of the bottom panel 130 in the assembled orientation. According to example aspects, the bottom panel 130 can be folded at a plurality of bottom panel bend lines 250 (shown in FIG. 2) to form the bottom panel seams 126. FIG. 1D illustrates an outer bottom panel surface 134 of the bottom panel 130, opposite the inner bottom panel surface 132 (shown in FIG. 1A), according to one particular example aspect of the lawn refuse bag 100. The various bottom panel seams 126 of the bottom panel 130 in the assembled orientation are also shown.

Figure 2:
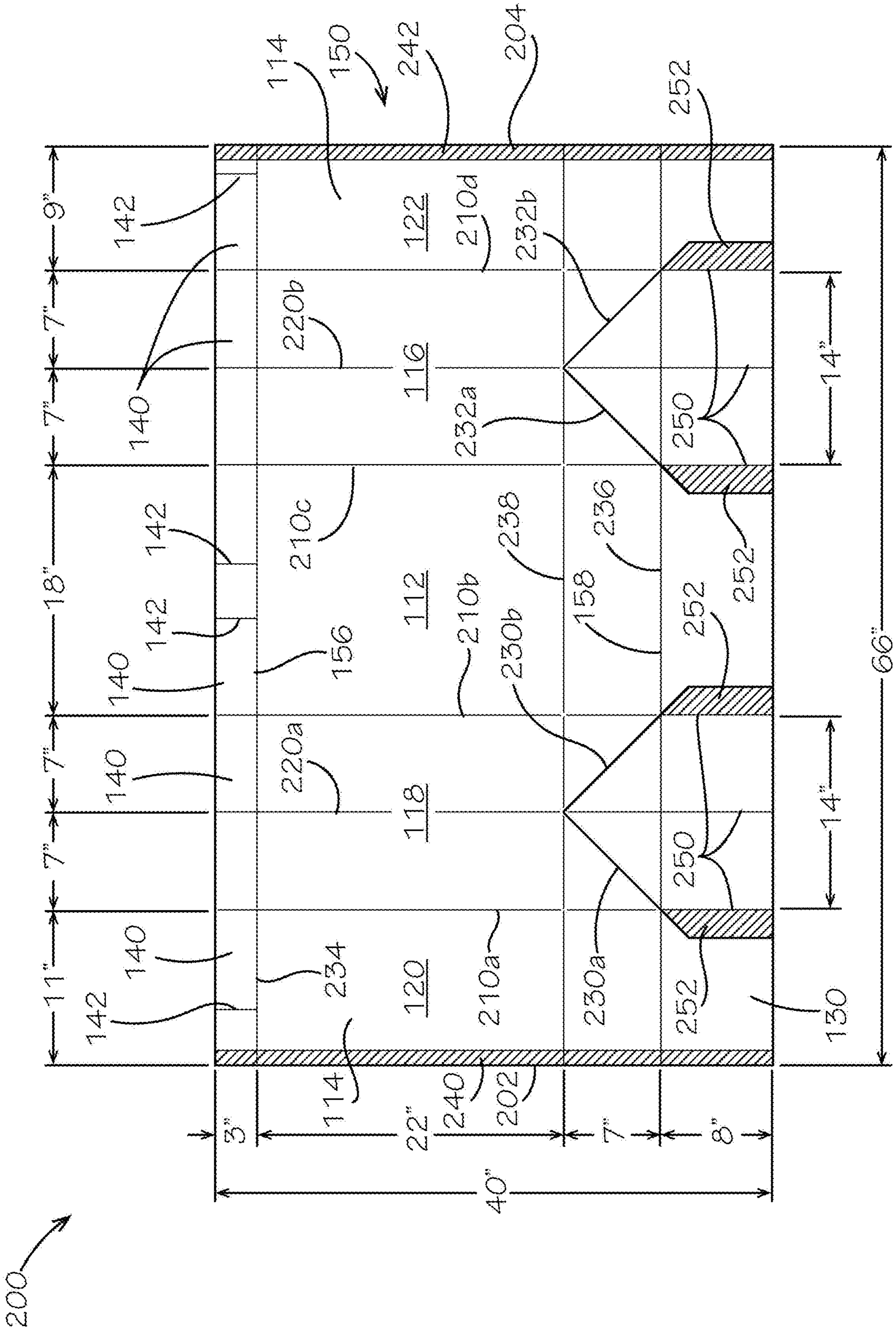
FIG. 2 is a bag blank in an unassembled orientation that can be assembled to form the lawn refuse bag of FIG. 1A.

FIG. 2 illustrates the bag blank 200 for forming the lawn refuse bag 100 (shown in FIG. 1A) in an unassembled orientation. Various dimensions for the bag blank 200 are shown in inches, according to an example aspect of the present disclosure. The dimensions disclosed herein are merely examples and should not be construed as limiting. As shown, the bag blank 200 can be a single, continuous blank defining a first blank end, such as a left blank end 202, relative to the orientation shown, and an opposite second blank end, such as a right blank end 204, relative to the orientation shown. Each of the sidewall panels 112, 114, 116, 118 can be connected to adjacent sidewall panels 112, 114, 116, 118 by a corner bend line 210, and the corner bend lines 210 can define the vertical corners 154 (shown in FIG. 1A) in the assembled orientation (shown in FIG. 1A). For example, the first rear sidewall subpanel 120 of the rear sidewall panel 114 can be connected to the left sidewall panel 118 by a first corner bend line 210*a*, the left sidewall panel 118 can be connected to the front sidewall panel 112 by a second corner bend line 210*b*, the front sidewall panel 112 can be connected to the right sidewall panel 116 by a third corner bend line 210*c*, and the right sidewall panel 116 can be connected to the second rear sidewall subpanel 122 of the rear sidewall panel 114 by a fourth corner bend line 210*d*.

Each of the left sidewall panel 118 and right sidewall panel 116 can also comprise a vertical center bend line 220*a,b*, respectively, relative to the orientation shown, extending along a centerline thereof. The center bend lines 220*a,b* can facilitate folding of the lawn refuse bag 100, as described in further detail with reference to FIG. 3A. Additionally, the bag blank 200 can define a horizontal bend line 238, relative to the orientation shown, that can extend across the sidewall panels 112, 114, 116, 118 about perpendicular to the corner bend lines 210*a,b, c, d* and center bend lines 220*a,b*. As shown, the bend line 238 can be oriented between the first end 156 of the sidewall enclosure 150 and the second end 158 of the sidewall enclosure 150. Moreover, each of the left sidewall panel 118 and right sidewall panel 116 can define a pair of opposing angled bend lines 230*a,b* and 232*a,b*, respectively. For example, referring to the left sidewall panel 118, a first one of the angled bend lines 230*a* can extend at about a 45° angle between the corresponding center bend line 220*a* the intersection of the left sidewall panel 118 with the bottom panel 130 and the first rear sidewall subpanel 120. A second one of the angled bend lines 230*b* can extend at about a 45° angle between the center bend line 220*a* and the intersection of the left sidewall panel 118 with the bottom panel 130 and the front sidewall panel 112. As such, the pair of angled bend lines 230*a,b* can substantially define an inverted V-shape, wherein an apex of the inverted V-shape can intersect the horizontal bend line 238, as shown. The angled bend lines 232*a,b* of the right sidewall panel 116 can be similarly formed. The pairs of angled bend lines 230_a,b_ and 232_a,b_ and the bend line 238 can further aid in folding the lawn refuse bag 100, as described in further detail with reference to FIG. 3B. In the present aspect, the various bend lines of the bag blank 200 can be formed by a crease; however, in other aspects, some or all of the bend lines can be formed by a perforation, a series of perforations, or any other suitable arrangement configured to weaken the area of the bend line to facilitate bending along the bend line.

As shown, the top flap segments 140 can be formed as a single strip of material extending fully along the length of the sidewall enclosure 150 from the left blank end 202 to the right blank end 204. The top flap segments 140 can be divided from one another by the corresponding corner bend lines 210_a,b, c, d_. Furthermore, the top flap segments 140 can be connected to the first end 156 of the sidewall enclosure 150 by a top flap bend line 234. The bottom panel 130 can also extend along fully along the length of the sidewall enclosure 150 from the left blank end 202 to the right blank end 204, and can be connected to the second end 158 of the sidewall enclosure 150 by a bottom panel bend line 236. A first fastening flap, such as a left fastening flap 240, relative to the orientation shown, can be formed at the left blank end 202 and can extend along the first rear sidewall subpanel 120, the corresponding top flap segment 140, and the bottom panel 130. A second fastening flap, such as a right fastening flap 242, relative to the orientation shown, can be formed at the right blank end 204 and can extend along the second rear sidewall subpanel 122, the corresponding top flap segment 140, and the bottom panel 130. A first step in assembling the lawn refuse bag 100 from the blank can comprise overlapping and securing the left fastening flap 240 to the right fastening flap 242, which can define the joining seam 124 (shown in FIG. 1A) in the assembled orientation.

According to example aspects, a second step in assembling the lawn refuse bag 100 can comprising folding the bottom panel 130 and securing the bottom panel 130 in the folded configuration. As shown, multiple bottom panel bend lines 250 can be provided to facilitate folding the bottom panel 130 into the orientation substantially perpendicular to the sidewall enclosure 150 in the assembled orientation (shown in FIG. 1A). As shown, the bottom panel 130 can also comprise one or more base panel attachment regions, such as bottom panel attachment regions 252, that can be secured the lawn refuse bag 100 (e.g., to each other and/or other portions of the bottom panel 130) to retain the bottom panel 130 in the folded configuration of the assembled orientation, and to form the bottom panel seams 126 (shown in FIGS. 1C and 1D). The bottom panel attachment regions 252 can be secured in the folded configuration by a fastener, such as, for example, an adhesive, such as glue or tape. In other aspects, the first and second steps for assembling the lawn refuse bag 100 can be performed in reverse order.

Figure 3A:
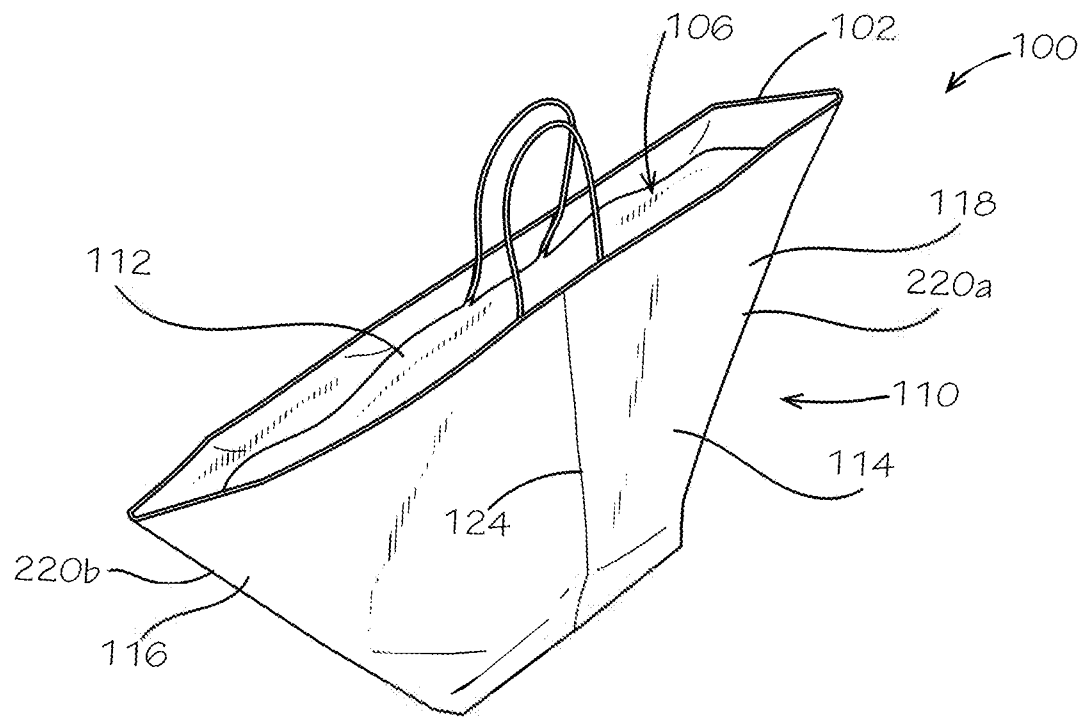
FIG. 3A is a top perspective view of the lawn refuse bag of FIG. 1A in a partially folded orientation.
Figure 3B:
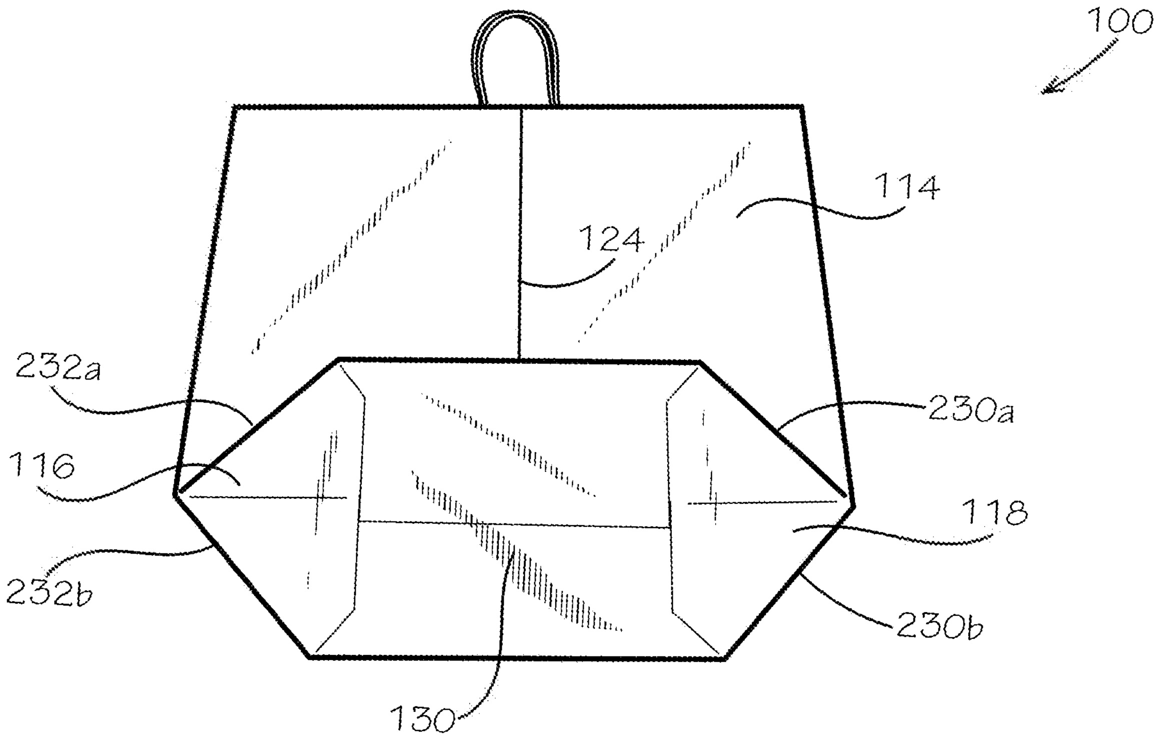
FIG. 3B is a front view of the lawn refuse bag of FIG. 1A in a folded orientation.

FIG. 3A illustrates the lawn refuse bag 100 in a partially folded orientation. As shown, the lawn refuse bag 100 can be folded along the center bend lines 220_a,b_ of the left sidewall panel 118 and right sidewall panel 116, respectively. In folding the lawn refuse bag 100 along the center bend lines 220_a,b_, the front sidewall panel 112 and rear sidewall panel 114 can be drawn towards one another, closing or partially closing the top opening 106 at the top end 102 of the bag body 110. FIG. 3B illustrates the lawn refuse bag 100 in a fully folded orientation. The lawn refuse bag 100 can be folded along the angled bend lines 230_a,b_ of the left sidewall panel 118 and the angled bend lines 232_a,b_ of the right sidewall panel 116. The lawn refuse bag 100 can then be further folded along the bend line 238, such that at least a portion of the bottom panel 130 of the lawn refuse bag 100 can be folded to lie substantially flat against the rear sidewall panel 114, as shown. In other aspects, the at least a portion of the bottom panel 130 can be folded to lie substantially flat against the front sidewall panel 112 (shown in FIG. 1).

Figure 4A:
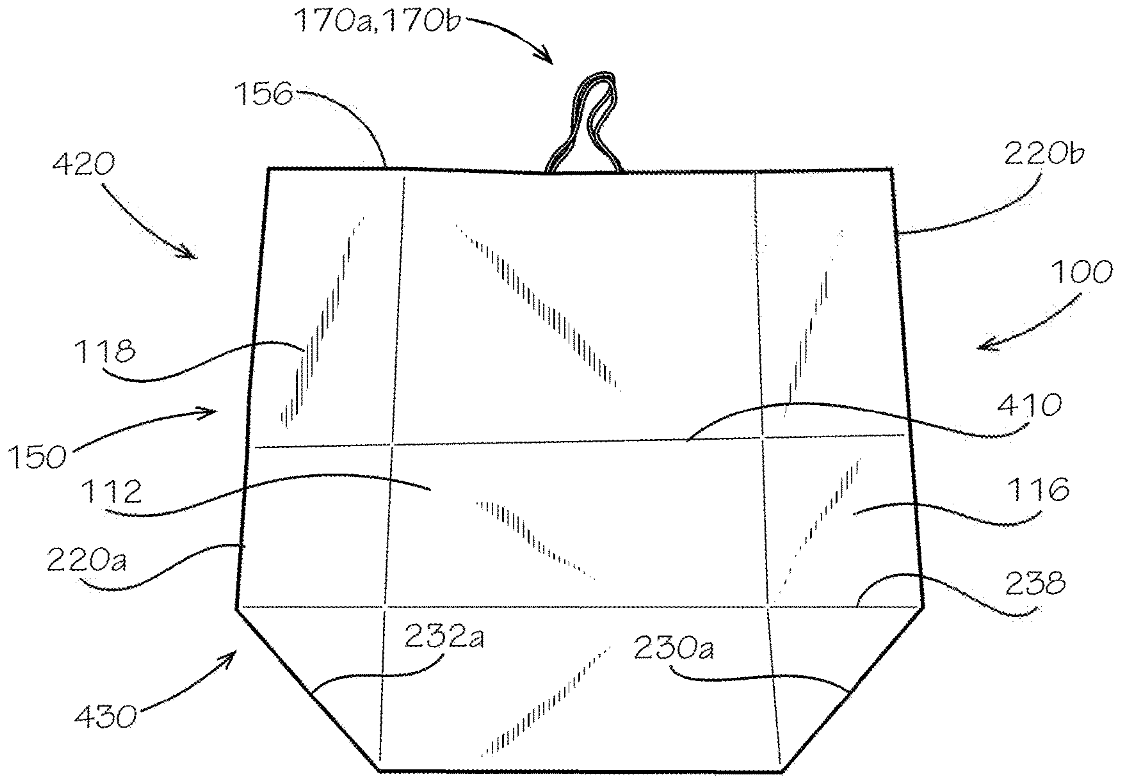
FIG. 4A is a front view of the lawn refuse in the partially folded orientation, according to another aspect of the present disclosure.
Figure 4B:
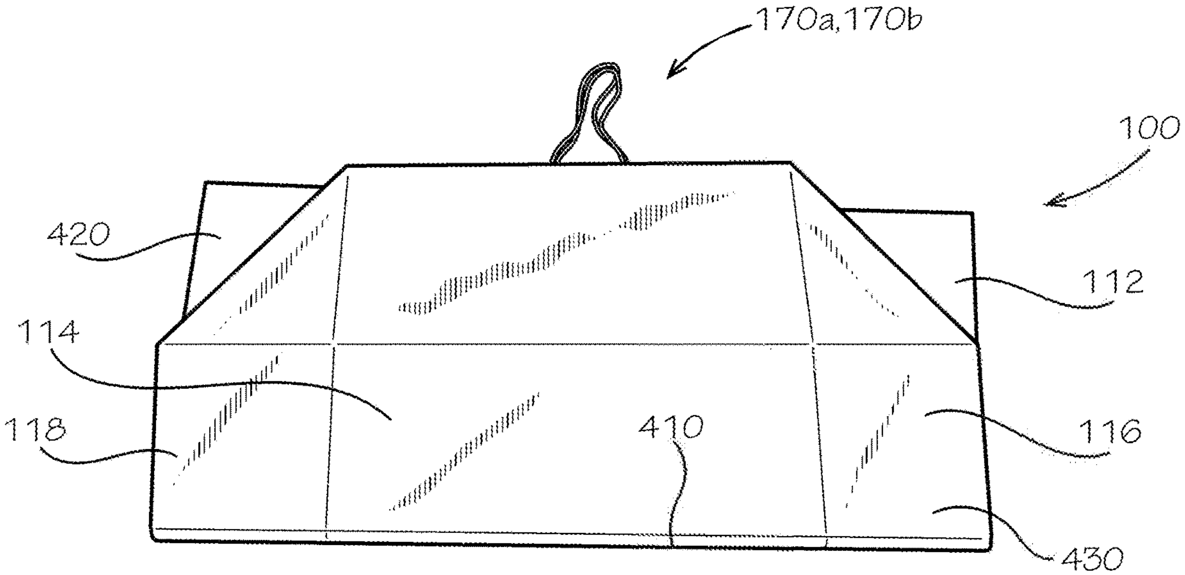
FIG. 4B is a front view of the lawn refuse bag of FIG. 4A in the folded orientation, according to another aspect of the present disclosure.

FIGS. 4A and 4B illustrate another example method of folding another aspect of the lawn refuse bag 100. As shown in FIG. 4A, the lawn refuse bag 100 can be folded in a similar manner to the folded lawn refuse bag 100 shown in FIGS. 3A and 3B. Example aspects of the current lawn refuse bag 100 can also comprise an additional bend line 410 extending horizontally, relative to the orientation shown, across the sidewall panels 112, 114, 116, 118 (rear sidewall panel 114 shown in FIG. 1). The bend line 410 can be oriented between the bend line 238 and the first end 156 of the sidewall enclosure 150, and can be substantially perpendicular to the same. The bend line 410 can also generally define an upper region 420 and an opposite lower region 430 of the lawn refuse bag 100. As shown in FIG. 4B, the lawn refuse bag 100 can further be folded at the bend line 410, such that the lower region 430 of the lawn refuse bag 100 can lie substantially flat against the upper region 420 of the lawn refuse bag 100 to further reduce the footprint of the folded lawn refuse bag 100.

Figure 5:
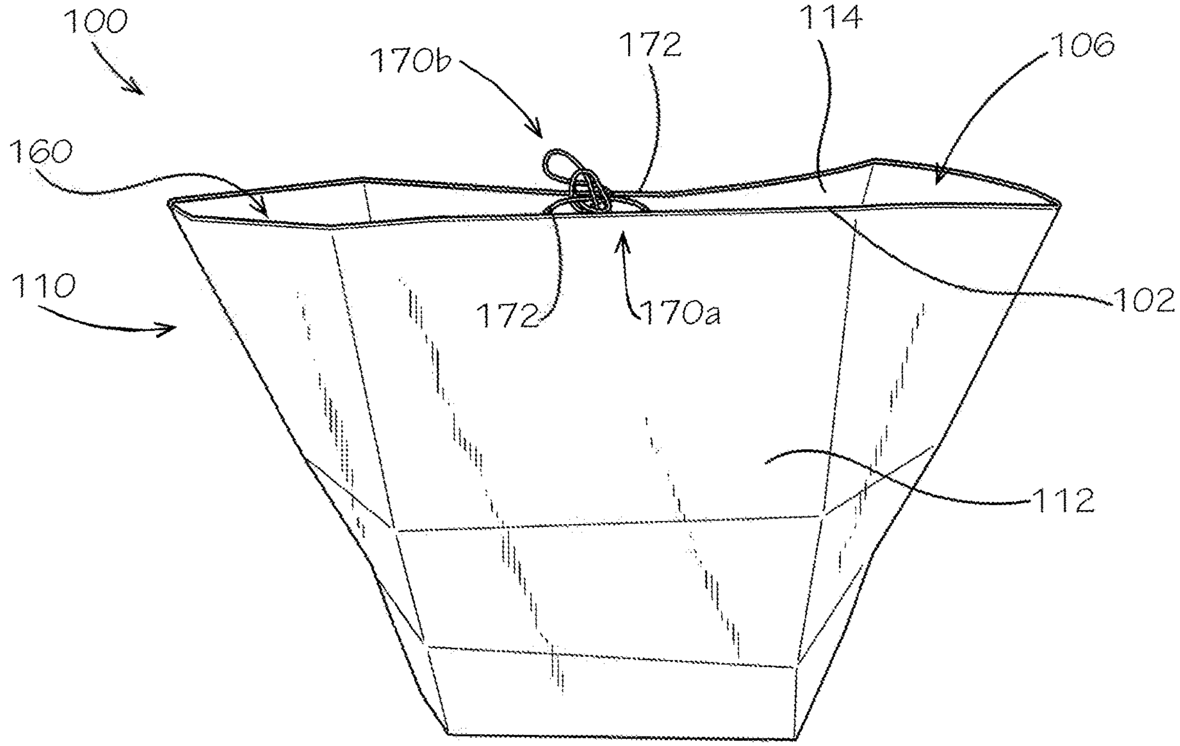
FIG. 5 is a top perspective view of the lawn refuse bag of FIG. 1A in a closed orientation.
Figure 6:
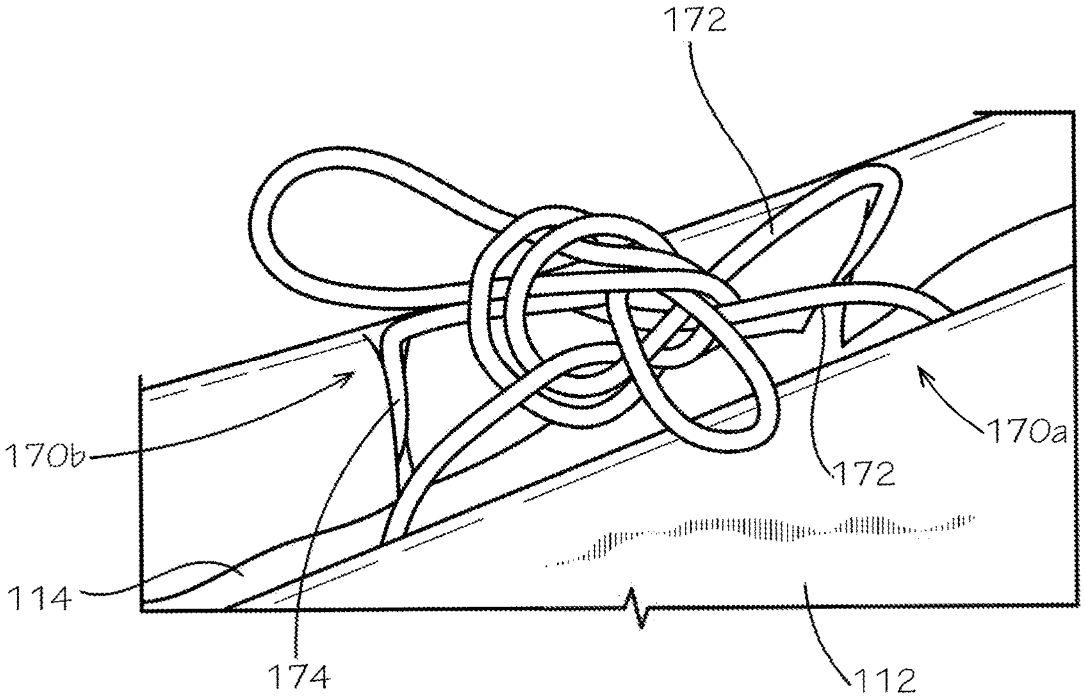
FIG. 6 is a detail view of a pair of handle assemblies of the lawn refuse bag of FIG. 1A in a tied configuration.

FIG. 5 illustrates the top end 102 of the bag body 110 in a closed orientation. In the closed orientation, the top end 102 of the bag body 110 can be fully closed or can be partially closed, as shown. As shown, in the closed orientation, the handle portion 172 of the first handle assembly 170_a_ can be tied together with the handle portion 172 of the second handle assembly 170_b_. For example, in the present aspect, the handle portions 172 can be tied together in the fashion of a double knot, such that the handle portions 172 can be retained in a tied configuration. However, in other aspects, the handle portions 172 can be tied together in a single knot or in any other suitable fashion that can retain the handle portions 172 in the tied configuration. When the handle portions 172 are tied together, the front sidewall panel 112 and rear sidewall panel 114 can be drawn together at the top end 102 of the bag body 110, and the top opening 106 of the bag body 110 can be closed or partially closed, as shown. As such, in the closed orientation, the lawn refuse received within the interior cavity 160 can be restricted from escaping the interior cavity 160 and additional lawn refuse can be prevented from insertion into the interior cavity 160. FIG. 6 is a detail view of the handle assemblies 170_a_, 170_b_ in the tied configuration.

As such, an example method for using the lawn refuse bag 100 can comprising providing the lawn refuse bag 100 comprising the bag body 110, the first handle assembly 170_a_, and the second handle assembly 170_b_, wherein the bag body 110 defines the interior cavity 160 and the top end 102, and the top end 102 defines the top opening 106. The method can further comprise inserting lawn refuse into the interior cavity 160 through the top opening 106 and then tying the handle portion 172 of the first handle assembly 170_a_ with the handle portion 172 of the second handle assembly 170_b_ to orient the top end 102 of the lawn refuse bag 100 in the closed orientation. To insert the lawn refuse into the lawn refuse bag 100, a cluster of the lawn refuse can be shifted (e.g., scooped, shoveled, etc.) from the lawn or yard into the interior cavity 160 manually or using a tool, such as, for example a rake. In one aspect, the lawn refuse bag 100 can be oriented in the upright orientation, as shown in FIG. 1A, wherein the bottom panel 130 of the bag body 110 is configured to lie on a ground surface (e.g., the yard, lawn, etc.). The lawn refuse can be scooped up off of the ground surface and dumped into the interior cavity 160. This process can be repeated until the lawn refuse bag 100 is full or until all of the lawn refuse is received within the lawn refuse bag 100, whichever comes first. In some aspects, the method can further comprise unfolding the lawn refuse bag 100 from a folded orientation to an unfolded orientation. The method may also comprise opening the top end 102 of the lawn refuse bag to orient the top end 102 in an open orientation prior to inserting the lawn refuse therein. Additional aspects can further comprise assembling the bag blank 200 to form the lawn refuse bag 100.

Figure 7:
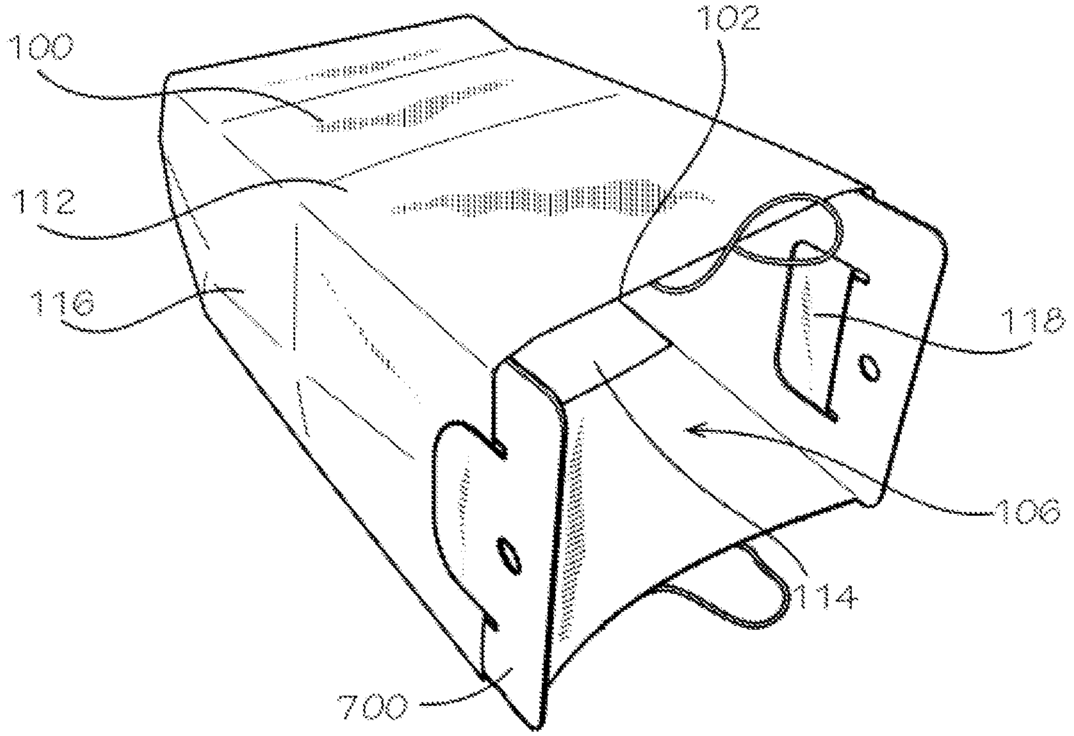
FIG. 7 is a top perspective view of the lawn refuse bag of FIG. 1A in a sideways orientation.

Referring to FIG. 7, in other aspect, the lawn refuse bag 100 can be oriented in a sideways orientation, as shown. According to example aspects, in the sideways orientation, the rear sidewall panel 114 of the bag body 110 can be configured to lie on the ground surface. In other aspects, any of the front sidewall panel 112, right sidewall panel 116, and left sidewall panel 118 can be configured to lie on the ground surface in the sideways orientation. According to example aspects, with the lawn refuse bag 100 in the sideways orientation, the lawn refuse can be shoveled directly from the ground surface into the interior cavity 160 through the top opening 106, which can be oriented adjacent to the ground surface. In some aspects, the one or more reinforcement strips can provide added structure to the lawn refuse bag 100 to prevent the front sidewall panel 112 from collapsing towards the rear sidewall panel 114 and to maintain the top opening 106 in the open orientation. In still other aspects, as depicted, a refuse bag insert 700 may be provide for providing additional structure to the lawn refuse bag 100.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A lawn refuse bag comprising:

a lawn bag body formed from a lawn bag blank defining a first blank end and an opposed second blank end, the lawn bag body defining a top end, a bottom end opposite the top end, and an interior cavity, the top end defining a top lawn bag opening, the lawn refuse bag configured to receive lawn refuse in the interior cavity through the top lawn bag opening in an erect and open orientation of the lawn refuse bag, the lawn bag body comprising a right sidewall panel, a left sidewall panel opposite the right sidewall panel, a front sidewall panel extending between the right and left sidewall panels, and a rear sidewall panel opposite the front sidewall panel and extending between the right and left sidewall panels;

wherein the lawn bag blank is rectangular and defined by a linear top edge, a linear bottom edge that is parallel to the linear top edge, a linear right side edge, and a linear left side edge, the linear right side edge and the linear left side edge being parallel to each other and extending between respective distal ends of the linear top edge and the linear bottom edge;

wherein the right sidewall panel comprises a first subpanel adjacent to one edge of the front sidewall panel and a second subpanel adjacent to one edge of the rear sidewall panel, the right sidewall panel defining a first vertical center bend line extending from the top end to the bottom end, the first vertical center bend line positioned between the first subpanel and the second subpanel;

wherein the left sidewall panel comprises a third subpanel adjacent to another edge of the front sidewall panel and a fourth subpanel adjacent to another edge of the rear sidewall panel, the left sidewall panel defining a second vertical center bend line extending from the top end to the bottom end, the second vertical center bend line positioned between the third subpanel and the fourth subpanel;

wherein a plurality of top flap segments are disposed at the top end of the lawn bag body;

a first handle assembly comprising a first connection portion and a first handle portion, the first connection portion being coupled to the lawn bag body at the top end between the front sidewall panel and a corresponding one of the plurality of top flap segments; and a second handle assembly comprising a second connection portion and a second handle portion, the second connection portion being coupled to the lawn bag body at the top end between the rear sidewall panel and a corresponding one of the plurality of top flap segments;

wherein:

each of the right sidewall panel and the left sidewall panel are folded outwards from the interior cavity in an erect and closed orientation;

the lawn refuse bag is configured to assume a folded orientation defined by:

each of the right sidewall panel and the left sidewall panel assuming an outwardly folded configuration with respect to the interior cavity;

the lawn refuse bag defining a bottom panel hingedly coupled to each of the front sidewall panel, the right sidewall panel, and the left sidewall panel at a bottom panel fold line; and the lawn refuse bag being folded at a horizontal bend line such that the bottom panel lies substantially parallel to each of the front sidewall panel, the right sidewall panel, and the left sidewall panel;

the lawn bag body defines a continuous joining seam extending across the first front sidewall panel from the top end to the bottom;

a first corner bend line is defined in the lawn bag body between a first portion of the front sidewall panel and the right sidewall panel;

a second corner bend line is defined in the lawn bag body between the right sidewall panel and the rear sidewall panel;

a third corner bend line is defined in the lawn bag body between the second rear sidewall panel and the left sidewall panel;

a fourth corner bend line is defined in the lawn bag body between the left sidewall panel and a second portion of the front sidewall panel;

each of the first, second, third, and fourth corner bend lines extend from the top end of the lawn bag body to the bottom end of the lawn bag body;

the right sidewall panel of the lawn bag body further defines a first pair of angled bend lines, the first pair of angled bend lines comprising a first angled bend line extending at approximately a 45° angle between the first vertical center bend line and a first intersection defined by an intersection of the first corner bend line, the right sidewall panel, and the bottom panel, and a second angled bend line extending at approximately a 45° angle between the first vertical center bend line and a second intersection defined by an intersection of the second corner bend line, the right sidewall panel, and the bottom panel;

the left sidewall panel of the lawn bag body defines a second pair of angled bend lines, the second pair of angled bend lines comprising a third angled bend line extending at approximately a 45° angle between the second vertical center bend line and a third intersection defined by an intersection of the third corner bend line, the left sidewall panel, and the bottom panel, and a fourth angled bend line extending at approximately a 45° angle between the second vertical center bend line and a fourth intersection defined by an intersection of the fourth corner bend line, the left sidewall panel, and the bottom panel;

the bottom panel further defines a first bottom panel sector, the first bottom panel sector bounded on one side by the first blank end, and on an opposite side by the first corner bend line, a second bottom panel sector, the second bottom panel sector bounded on one side by the second corner bend line, and on an opposite side by the third corner bend line, and a third bottom panel sector, the third bottom panel sector bounded on one side by the fourth corner bend line, and on an opposite side by the second blank end;

the first angled bend line extends downwardly beyond the first intersection and into the first bottom panel sector, an extended segment of the first angled bend line located in the first bottom panel sector defining a first angled bend line extension;

the second angled bend line extends downwardly beyond the second intersection and into the second bottom panel sector, an extended segment of the second angled bend line located in the second bottom panel sector defining a second angled bend line extension;

the third angled bend line extends downwardly beyond the third intersection and into the second bottom panel sector, an extended segment of the third angled bend line located in the second bottom panel sector defining a third angled bend line extension;

the fourth angled bend line extends downwardly beyond the fourth intersection and into the third bottom panel sector, an extended segment of the fourth angled bend line located in the third bottom panel sector defining a fourth angled bend line extension; and the bottom panel further defines a plurality of bottom panel bend lines and a plurality of bottom panel attachment regions, wherein each bottom panel attachment region in the plurality of bottom panel attachment regions is configured to be secured to at least one of another bottom panel attachment region in the plurality of bottom panel attachment regions and a portion of the bottom panel other than a bottom panel attachment region; and the plurality of bottom panel attachment regions comprises a first bottom panel attachment region, the first bottom panel attachment region partially defined by the first angled bend line extension and a first bottom panel bend line in the plurality of bottom panel bend lines that is colinear with the first corner bend line;

a second bottom panel attachment region, the second bottom panel attachment region partially defined by the second angled bend line extension and a second bottom panel bend line in the plurality of bottom panel bend lines that is colinear with the second corner bend line;

a third bottom panel attachment region, the third bottom panel attachment region partially defined by the third angled bend line extension and a third bottom panel bend line in the plurality of bottom panel bend lines that is colinear with the third corner bend line; and a fourth bottom panel attachment region, the fourth bottom panel attachment region partially defined by the fourth angled bend line extension and a fourth bottom panel bend line in the plurality of bottom panel bend lines that is colinear with the fourth corner bend line.

2. The lawn refuse bag of claim 1, wherein the lawn bag body defines a height and a width, the height of the lawn bag body in the erect and open orientation is about 29 inches, and the width of the rear sidewall panel in the erect and open orientation is about 18 inches.

3. The lawn refuse bag of claim 2, wherein the lawn bag body further defines a depth, and wherein the depth of the lawn bag body in the erect and open orientation is about 14 inches.

4. The lawn refuse bag of claim 1, wherein the bottom panel is substantially planar and is configured to rest on a ground surface.

5. The lawn refuse bag of claim 1, wherein the lawn bag body defines a height and a width, and the lawn bag body defines a height-to-width ratio in the erect and open orientation of about 1.6.

6. The lawn refuse bag of claim 1, wherein: in the erect and open orientation, the first handle assembly is disengaged from the second handle assembly; and in the erect and closed orientation, the first handle assembly engages the second handle assembly to substantially close the top lawn bag opening.

7. The lawn refuse bag of claim 1, wherein the first handle portion is tied to the second handle portion in the erect and closed orientation.

8. The lawn refuse bag of claim 1, wherein the lawn bag body is formed from a single lawn bag blank.

9. The lawn refuse bag of claim 1, wherein:

the first angled bend line and the second angled bend line intersect one another at a first vertex;

the third angled bend line and the fourth angled bend line intersect one another at a second vertex;

the horizontal bend line is defined in the lawn bag body intermediate the top end and the bottom panel fold line; and the horizontal bend line intersects both the first vertex and the second vertex.

10. The lawn refuse bag of claim 9, wherein the front sidewall panel confronts the rear sidewall panel at the top end in the erect and closed orientation.

11. The lawn refuse bag of claim 1, wherein in an assembled state of the lawn refuse bag, each portion of the bottom panel secured by a bottom panel attachment region in the plurality of bottom panel attachment regions at least partially defines a bottom panel seam.

12. A lawn bag, wherein:

a lawn bag body is formed from a lawn bag blank defining a first blank end and an opposed second blank end, and the lawn bag body defines a top end, a bottom end, and an interior cavity;

a first handle assembly comprises a first connection portion coupled to the lawn bag body and a first handle portion extending from the first connection portion away from the lawn bag body; and a second handle assembly comprises a second connection portion coupled to the lawn bag body and a second handle portion extending from the second connection portion away from the lawn bag body;

wherein the lawn bag body defines a right sidewall panel, a left sidewall panel opposite the right sidewall panel, a front sidewall panel extending between the right and left sidewall panels, a rear sidewall panel opposite the front sidewall panel and extending between the right and left sidewall panels, a bottom panel arranged at the bottom end, and a plurality of top flap segments disposed at a top end of the lawn bag body;

wherein the first connection portion of the first handle assembly is coupled to the lawn bag body at the top end between the front sidewall panel and a corresponding one of the plurality of top flap segments;

wherein the second connection portion of the second handle assembly is coupled to the lawn bag body at the top end between the rear sidewall panel and a corresponding one of the plurality of top flap segments;

wherein the lawn bag blank is rectangular and defined by a linear top edge, a linear bottom edge that is parallel to the linear top edge, a linear right side edge, and a linear left side edge, the linear right side edge and the linear left side edge being parallel to each other and extending between respective distal ends of the linear top edge and the linear bottom edge;

wherein the right sidewall panel comprises a first subpanel adjacent to one edge of the front sidewall panel and a second subpanel adjacent to one edge of the rear sidewall panel, the right sidewall panel defining a first vertical center bend line extending from the top end to the bottom end, the first vertical center bend line positioned between the first subpanel and the second subpanel;

wherein the left sidewall panel comprises a third subpanel adjacent to another edge of the front sidewall panel and a fourth subpanel adjacent to another edge of the rear sidewall panel, the left sidewall panel defining a second vertical center bend line extending from the top end to the bottom end, the second vertical center bend line positioned between the third subpanel and the fourth subpanel;

wherein the lawn bag body further defines:

a first corner bend line between a first portion of the front sidewall panel and the right sidewall panel;

a second corner bend line between the right sidewall panel and the rear sidewall panel;

a third corner bend line between the rear sidewall panel and the left sidewall panel;

a fourth corner bend line between the left sidewall panel and a second portion of the front sidewall panel;

each of the first, second, third, and fourth corner bend lines extending from the top end of the lawn bag body to the bottom end of the lawn bag body;

wherein the right sidewall panel of the lawn bag body defines a first pair of angled bend lines, the first pair of angled bend lines comprising a first angled bend line extending at approximately a 45° angle between the first vertical center bend line and a first intersection defined by an intersection of the first corner bend line, the right sidewall panel, and the bottom panel, and a second angled bend line extending at approximately a 45° angle between the first vertical center bend line and a second intersection defined by an intersection of the second corner bend line, the right sidewall panel, and the bottom panel;

wherein the left sidewall panel of the lawn bag body further defines a second pair of angled bend lines, the second pair of angled bend lines comprising a third angled bend line extending at approximately a 45° angle between the second vertical center bend line and a third intersection defined by an intersection of the third corner bend line, the left sidewall panel, and the bottom panel, and a fourth angled bend line extending at approximately a 45° angle between the second vertical center bend line and a fourth intersection defined by an intersection of the fourth corner bend line, the left sidewall panel, and the bottom panel;

wherein the bottom panel further defines a first bottom panel sector, the first bottom panel sector bounded on one side by the first blank end, and on an opposite side by the first corner bend line, a second bottom panel sector, the second bottom panel sector bounded on one side by the second corner bend line, and on an opposite side by the third corner bend line, and a third bottom panel sector, the third bottom panel sector bounded on one side by the fourth corner bend line, and on an opposite side by the second blank end;

wherein:

the first angled bend line extends downwardly beyond the first intersection and into the first bottom panel sector, an extended segment of the first angled bend line located in the first bottom panel sector defining a first angled bend line extension;

the second angled bend line extends downwardly beyond the second intersection and into the second bottom panel sector, an extended segment of the second angled bend line located in the second bottom panel sector defining a second angled bend line extension;

the third angled bend line extends downwardly beyond the third intersection and into the second bottom panel sector, an extended segment of the third angled bend line located in the second bottom panel sector defining a third angled bend line extension;

the fourth angled bend line extends downwardly beyond the fourth intersection and into the third bottom panel sector, an extended segment of the fourth angled bend line located in the third bottom panel sector defining a fourth angled bend line extension; and the bottom panel further defines a plurality of bottom panel bend lines and a plurality of bottom panel attachment regions, wherein each bottom panel attachment region in the plurality of bottom panel attachment regions is configured to be secured to at least one of another bottom panel attachment region in the plurality of bottom panel attachment regions and a portion of the bottom panel other than a bottom panel attachment region; and the plurality of bottom panel attachment regions comprises a first bottom panel attachment region, the first bottom panel attachment region partially defined by the first angled bend line extension and a first bottom panel bend line in the plurality of bottom panel bend lines that is colinear with the first corner bend line;

a second bottom panel attachment region, the second bottom panel attachment region partially defined by the second angled bend line extension and a second bottom panel bend line in the plurality of bottom panel bend lines that is colinear with the second corner bend line;

a third bottom panel attachment region, the third bottom panel attachment region partially defined by the third angled bend line extension and a third bottom panel bend line in the plurality of bottom panel bend lines that is colinear with the third corner bend line; and a fourth bottom panel attachment region, the fourth bottom panel attachment region partially defined by the fourth angled bend line extension and a fourth bottom panel bend line in the plurality of bottom panel bend lines that is colinear with the fourth corner bend line.

13. The lawn bag body of claim 12, wherein the lawn bag body is configured to assume a folded orientation defined by:

each of the right sidewall panel and the left sidewall panel assuming an outwardly folded configuration with respect to the interior cavity; and the lawn refuse bag body being folded at a horizontal bend line such that the bottom panel lies substantially parallel to each of the front sidewall panel, the right sidewall panel, and the left sidewall panel.

14. The lawn bag body of claim 12, wherein the lawn bag body further defines a height, and wherein the height of the lawn bag body in an erect and open orientation is about 29 inches.

15. The lawn refuse bag of claim 12, wherein the lawn bag body is formed from a single lawn bag blank.

16. The lawn bag body of claim 12, wherein:

the lawn bag body is configured to assume a folded orientation defined by:

each of the right sidewall panel and the left sidewall panel assuming an outwardly folded configuration with respect to the interior cavity;

the bottom panel being hingedly coupled to each of the front sidewall panel, the right sidewall panel, and the left sidewall panel at a bottom panel fold line; and the lawn bag body being folded at a horizontal bend line such that the bottom panel lies substantially parallel to each of the front sidewall panel, the right sidewall panel, and the left sidewall panel;

the first angled bend line and the second angled bend line intersect one another at a first vertex;

the third angled bend line and the fourth angled bend line intersect one another at a second vertex;

the horizontal bend line is defined in the lawn bag body intermediate the top end and the bottom panel fold line; and the horizontal bend line intersects both the first vertex and the second vertex.

17. The lawn bag body of claim 12, wherein in an assembled state of the lawn refuse bag, each portion of the bottom panel secured by a bottom panel attachment region in the plurality of bottom panel attachment regions at least partially defines a bottom panel seam.

18. A lawn refuse bag comprising:

a lawn bag body formed from a lawn bag blank defining a first blank end and an opposed second blank end, the lawn bag body defining a top end, a bottom end, and an interior cavity, the top end defining a top lawn bag opening, the lawn refuse bag configured to receive lawn refuse in the interior cavity through the top lawn bag opening in an erect and open orientation of the lawn refuse bag, the lawn bag body comprising a right sidewall panel, a left sidewall panel opposite the right sidewall panel, a front sidewall panel extending between the right and left sidewall panels, a second rear sidewall panel opposite the first-front sidewall panel and extending between the right and left sidewall panels, and a bottom panel arranged at the bottom end;

wherein the lawn bag blank is rectangular and defined by a linear top edge, a linear bottom edge that is parallel to the linear top edge, a linear right side edge, and a linear left side edge, the linear right side edge and the linear left side edge being parallel to each other and extending between respective distal ends of the linear top edge and the linear bottom edge;

wherein the right sidewall panel comprises a first subpanel adjacent to one edge of the front sidewall panel and a second subpanel adjacent to one edge of the rear sidewall panel, the right sidewall panel defining a first vertical center bend line extending from the top end to the bottom end, the first vertical center bend line positioned between the first subpanel and the second subpanel;

wherein the left sidewall panel comprises a third subpanel adjacent to another edge of the front sidewall panel and a fourth subpanel adjacent to another edge of the rear sidewall panel, the left sidewall panel defining a second vertical center bend line extending from the top end to the bottom end, the second vertical center bend line positioned between the third subpanel and the fourth subpanel;

wherein a plurality of top flap segments are disposed at the top end of the lawn bag body;

a first handle assembly comprising a first connection portion and a first handle portion, the first connection portion being coupled to the lawn bag body at the top end between the front sidewall panel and a corresponding one of the top flap segments; and a second handle assembly comprising a second connection portion and a second handle portion, the second connection portion being coupled to the lawn bag body at the top end between the rear sidewall panel and a corresponding one of the top flap segments;

wherein:

a volume of the lawn bag body in an erect and open orientation is at least about 7,308 cubic inches, and each of the right and left sidewall panels are respectively folded outwards from the interior cavity along the first vertical center bend line and the second vertical center bend line in the erect and closed orientation;

wherein the lawn bag body further defines:

a first corner bend line between a first portion of the front sidewall panel and the right sidewall panel;

a second corner bend line between the right sidewall panel and the rear sidewall panel;

a third corner bend line between the rear sidewall panel and the left sidewall panel;

a fourth corner bend line between the left sidewall panel and a second portion of the front sidewall panel;

each of the first, second, third, and fourth corner bend lines extending from the top end of the lawn bag body to the bottom end of the lawn bag body;

wherein the right sidewall panel of the lawn bag body further defines a first pair of angled bend lines, the first pair of angled bend lines comprising a first angled bend line extending at approximately a 45° angle between the first vertical center bend line and a first intersection defined by an intersection of the first corner bend line, the right sidewall panel, and the bottom panel, and a second angled bend line extending at approximately a 45° angle between the first vertical center bend line and a second intersection defined by an intersection of the second corner bend line, the right sidewall panel, and the bottom panel;

wherein the left sidewall panel of the lawn bag body further defines a second pair of angled bend lines, the second pair of angled bend lines comprising a third angled bend line extending at approximately a 45° angle between the second vertical center bend line and a third intersection defined by an intersection of the third corner bend line, the left sidewall panel, and the bottom panel, and a fourth angled bend line extending at approximately a 45° angle between the second vertical center bend line and a fourth intersection defined by an intersection of the fourth corner bend line, the left sidewall panel, and the bottom panel;

wherein the bottom panel further defines a first bottom panel sector, the first bottom panel sector bounded on one side by the first blank end, and on an opposite side by the first corner bend line, a second bottom panel sector, the second bottom panel sector bounded on one side by the second corner bend line, and on an opposite side by the third corner bend line, and a third bottom panel sector, the third bottom panel sector bounded on one side by the fourth corner bend line, and on an opposite side by the second blank end;

wherein:

the first angled bend line extends downwardly beyond the first intersection and into the first bottom panel sector, an extended segment of the first angled bend line located in the first bottom panel sector defining a first angled bend line extension;

the second angled bend line extends downwardly beyond the second intersection and into the second bottom panel sector, an extended segment of the second angled bend line located in the second bottom panel sector defining a second angled bend line extension;

the third angled bend line extends downwardly beyond the third intersection and into the second bottom panel sector, an extended segment of the third angled bend line located in the second bottom panel sector defining a third angled bend line extension; and the fourth angled bend line extends downwardly beyond the fourth intersection and into the third bottom panel sector, an extended segment of the fourth angled bend line located in the third bottom panel sector defining a fourth angled bend line extension; and the bottom panel further defines a plurality of bottom panel bend lines and a plurality of bottom panel attachment regions, wherein each bottom panel attachment region in the plurality of bottom panel attachment regions is configured to be secured to at least one of another bottom panel attachment region in the plurality of bottom panel attachment regions and a portion of the bottom panel other than a bottom panel attachment region; and the plurality of bottom panel attachment regions comprises a first bottom panel attachment region, the first bottom panel attachment region partially defined by the first angled bend line extension and a first bottom panel bend line in the plurality of bottom panel bend lines that is colinear with the first corner bend line;

a second bottom panel attachment region, the second bottom panel attachment region partially defined by the second angled bend line extension and a second bottom panel bend line in the plurality of bottom panel bend lines that is colinear with the second corner bend line;

a third bottom panel attachment region, the third bottom panel attachment region partially defined by the third angled bend line extension and a third bottom panel bend line in the plurality of bottom panel bend lines that is colinear with the third corner bend line; and a fourth bottom panel attachment region, the fourth bottom panel attachment region partially defined by the fourth angled bend line extension and a fourth bottom panel bend line in the plurality of bottom panel bend lines that is colinear with the fourth corner bend line.

19. The lawn refuse bag of claim 18, wherein, in the erect and open orientation, a height of the lawn bag body is about 29 inches, a width of the lawn bag body is about 18 inches, and a depth of the lawn bag body is about 14 inches.

20. The lawn refuse bag of claim 18, wherein the bottom panel is substantially planar and is configured to rest on a ground surface.

21. The lawn refuse bag of claim 18, wherein the lawn refuse bag is configured to assume a folded orientation defined by:

each of the right sidewall panel and the left sidewall panel assuming an outwardly folded configuration with respect to the interior cavity;

the lawn refuse bag being folded at a horizontal bend line such that the bottom panel substantially parallel to each of the front sidewall panel, the right sidewall panel, and the left sidewall panel.

22. The lawn refuse bag of claim 18, wherein:

in the erect and open orientation, the first handle assembly is disengaged from the second handle assembly; and in the erect and closed orientation, the first handle assembly engages the second handle assembly to substantially close the top lawn bag opening.

23. The lawn refuse bag of claim 18, wherein the first handle portion is tied to the second handle portion in the erect and closed orientation.

24. The lawn refuse bag of claim 18, wherein the front sidewall panel confronts the rear sidewall panel at the top end in the erect and closed orientation.

25. The lawn refuse bag of claim 18, wherein:

the lawn refuse bag is configured to assume a folded orientation defined by:

each of the right sidewall panel and the left sidewall panel assuming an outwardly folded configuration with respect to the interior cavity;

the bottom panel being hingedly coupled to each of the front sidewall panel, the right sidewall panel, and the left sidewall panel at a bottom panel fold line; and the refuse lawn bag being folded at a horizontal bend line such that the bottom panel lies substantially parallel to each of the front sidewall panel, the right sidewall panel, and the left sidewall panel;

the first angled bend line and the second angled bend line intersect one another at a first vertex;

the third angled bend line and the fourth angled bend line intersect one another at a second vertex;

the horizontal bend line is defined in the lawn bag body intermediate the top end and the bottom panel fold line; and the horizontal bend line intersects both the first vertex and the second vertex.

26. The lawn refuse bag of claim 18, wherein in an assembled state of the lawn refuse bag, each portion of the bottom panel secured by a bottom panel attachment region in the plurality of bottom panel attachment regions at least partially defines a bottom panel seam.

* * * * *